(12) United States Patent
Martin

(10) Patent No.: US 11,146,345 B2
(45) Date of Patent: Oct. 12, 2021

(54) TELECOMMUNICATIONS APPARATUS AND METHODS FOR PERFORMING MEASUREMENTS OF AN UNLICENSED CARRIER

(71) Applicant: SONY CORPORATION, Tokyo (JP)

(72) Inventor: Brian Alexander Martin, Basingstoke (GB)

(73) Assignee: SONY CORPORATION, Tokyo (JP)

(*) Notice: Subject to any disclaimer, the term of this patent is extended or adjusted under 35 U.S.C. 154(b) by 47 days.

(21) Appl. No.: 15/315,928

(22) PCT Filed: Jul. 2, 2015

(86) PCT No.: PCT/EP2015/065066
§ 371 (c)(1),
(2) Date: Dec. 2, 2016

(87) PCT Pub. No.: WO2016/008730
PCT Pub. Date: Mar. 21, 2016

(65) Prior Publication Data
US 2017/0093508 A1   Mar. 30, 2017

(30) Foreign Application Priority Data

Jul. 16, 2014 (EP) ..................................... 14177234

(51) Int. Cl.
*H04B 17/318* (2015.01)
*H04W 16/14* (2009.01)
(Continued)

(52) U.S. Cl.
CPC .......... *H04B 17/318* (2015.01); *H04W 16/14* (2013.01); *H04W 24/02* (2013.01);
(Continued)

(58) Field of Classification Search
CPC .... H04B 17/318; H04W 16/14; H04W 24/02; H04W 24/10; H04W 36/30; H04W 74/006; H04W 88/08
(Continued)

(56) References Cited

U.S. PATENT DOCUMENTS 9,408,103 B2 * 8/2016 Bai ....................... H04W 24/10
2013/0088983 A1   4/2013 Pragada et al.
(Continued)

FOREIGN PATENT DOCUMENTS

WO       2012/116489 A1   9/2012
WO   WO 2012116489 A1 *  9/2012 ............. H04L 5/001
(Continued)

OTHER PUBLICATIONS

International Search Report dated Sep. 15, 2015 in PCT/EP2015/065066 filed Jul. 2, 2015.
(Continued)

*Primary Examiner* — Melvin C Marcelo
*Assistant Examiner* — Natali Pascual Peguero
(74) *Attorney, Agent, or Firm* — Xsensus LLP

(57) ABSTRACT

A method of operating a terminal device to perform measurement event evaluation for measurement reporting in respect of a downlink carrier in a wireless telecommunications system. The method includes determining that measurement event evaluation for the downlink carrier should be undertaken. Measurements of a parameter associated with radio channel conditions for frequency resources used by the downlink carrier are obtained during an evaluation period beginning at a start time. The extent to which the downlink carrier is being transmitted during the evaluation period is also established. Whether or not to send a measurement report to network infrastructure equipment is then evaluated by taking account of both the measurements of the param-
(Continued)

eter during the evaluation period and the extent to which the downlink carrier is being transmitted during the evaluation period.

24 Claims, 8 Drawing Sheets

(51) Int. Cl.
*H04W 24/02* (2009.01)
*H04W 24/10* (2009.01)
*H04W 74/00* (2009.01)
*H04W 36/30* (2009.01)
*H04W 36/00* (2009.01)
*H04W 88/08* (2009.01)

(52) U.S. Cl.
CPC .......... *H04W 24/10* (2013.01); *H04W 36/30* (2013.01); *H04W 74/006* (2013.01); *H04W 36/0058* (2018.08); *H04W 88/08* (2013.01)

(58) Field of Classification Search
USPC ........................................ 370/232, 252, 332
See application file for complete search history.

(56) References Cited

U.S. PATENT DOCUMENTS

| | | |
|---|---|---|
| 2013/0336156 A1 | 12/2013 | Wei et al. |
| 2014/0302865 A1 | 10/2014 | Bai et al. |
| 2015/0189523 A1* | 7/2015 | Michel .............. H04W 36/0088 370/252 |
| 2015/0201343 A1* | 7/2015 | Jung .................... H04W 24/10 370/252 |
| 2016/0192334 A1* | 6/2016 | Takeda ................. H04W 48/16 370/329 |

FOREIGN PATENT DOCUMENTS

| | | | | |
|---|---|---|---|---|
| WO | 2013/059999 | A1 | 5/2013 | |
| WO | 2013/071488 | A1 | 5/2013 | |
| WO | WO 2013059999 | A1 * | 5/2013 | ............ H04W 24/10 |

OTHER PUBLICATIONS

Harri Holma et al., "LTE for UMTS OFDMA and SC-FDMA Based Radio Access", Wiley, 2009, 4 pages.
"LTE; Evolved Universal Terrestrial Radio Access (E-UTRA) Physical chamois and, modulation (3GPP TS 36.211 version 11.5.0 Release 11)", ETSI TS 136 211, Version 11.5,0, Technical Specification, Release 11, Jan. 2014. 122 pages.
"LTE; Evolved Universal Terrestrial Radio Access (E-UTRA): Multiplexing and channel cocting (3GPP TS 36.212 version 11.4.0 Release 11)", ETSI TS 136 212, Version 11.4.0, Techniczi Speciftation, Release 11, Jan. 2014: 86 pages.
"LTE; Evolved Universal Terrestrial Radio Access (E-UTRA); Physical layer procedures (3GPP TS 36 213. version 11.6.0 Release 11)", ETSI TS 136 213, Version 11.6.0, Technical Specilitation, Release 11; Mar. 2014, 184 pages.
"LTE; Evolved Universal Terrestrial Radio Access (E-UTRA); Medium Access Control (MAC) protocol' specification (3GPP TS 36.321 version 11.5.0 Release 11)", ETSI TB 136 321, Version 11.5.0; Technical Specification, Release 11, Mar. 2014, 59 pages.
"LTE; Evolved Universal Terrestrial Radio Access (E-UTRA); Radio Resource Control (RRC); Protocol specification (3GPP TS 36.331 version 11 .7.0 Release 11)", ETSI TS 136 331, Version 11.7 .0. Technical Specification, Release 11, Mar. 2014, 354 pages.
Sophia Anitpolis, "Requirements and and Coexistence Topics for LTE-U", 3GPP LTE-U Workshop, RWS-140010, Jun. 13, 2014, 11 pages, XP05086626.9.
Office Action issues in European Application 15 731 997.1-1214 dated Apr. 18, 2019.
Chinese Office Action dated Jul. 1, 2019 in Chinese Application No. 2015800383209.
Office Action dated Jul. 9, 2021, in corresponding Korean patent Application No. 10-2017-7000891, 10 pages.
3GPP TS 36.331 V12.2.0, "3rd Generation Partnership Project; Technical Specification Group Radio Access Network; Evolved Universal Terrestrial Radio Access (E-UTRA); Radio Resource Control (RRC); Protocol specification (Release 12)", Jul. 4, 2014, total 365 pages.

\* cited by examiner

TELECOMMUNICATIONS APPARATUS AND METHODS FOR PERFORMING MEASUREMENTS OF AN UNLICENSED CARRIER

CROSS-REFERENCE TO RELATED APPLICATIONS

The present application is based on PCT filing PCT/EP2015/065066 filed Jul. 2, 2015, and claims priority to European Patent Application 14 177 234.3, filed in the European Patent Office on Jul. 16, 2014, the entire contents of each of which is being incorporated herein by reference.

BACKGROUND

Field

The present disclosure relates to mobile communications networks and methods for communicating data using mobile communications networks, infrastructure equipment for mobile communications networks, communications devices for communicating data via mobile communications networks and methods of communicating via mobile communications networks.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

It is well known in the field of wireless telecommunications for regions of the radio spectrum to be assigned to different mobile network operators (MNO) for their exclusive use through a license. A license typically grants an MNO exclusive use over a number of years of a predefined portion of the radio frequency spectrum in which to deploy a mobile communications network (e.g. GSM, WCDMA/HSPA, LTE/LTE-A). This licensing approach can help guarantee Quality of Service (QoS) and provides an operator with control of the radio resources and mobility. In particular, an operator has some degree of guarantee that no other radio services should interfere with the radio resources that have been assigned to the operator, and within the limitations of the license conditions the operator has exclusive control over what radio technology it deploys in the network. Consequently, a wireless telecommunications system that is primarily designed to operate using radio resources that have been licensed for exclusive use by the wireless telecommunications system can operate with a degree of centralised control and coordination to help make most efficient use of the available radio resources. Such a wireless telecommunication system can also manage interference internally, based on standard specifications, since the license grants it good immunity from external interference sources. Coexistence of different devices deployed on an MNO's licensed band is managed through conformance to relevant radio standards. Licensed spectrum is today usually assigned to operators via government-organised auctions, but so-called "beauty contests" continue also to be in use.

It is also well known in the field of wireless telecommunications for regions of the available radio spectrum to remain unlicensed. Unlicensed (license exempt) radio spectrum may, at least to some extent, be freely used by a number of different technologies, such as Wi-Fi and Bluetooth and other non-3GPP radio access technologies (RATs). Operating parameters for devices using unlicensed spectrum bands are typically stipulated by technical regulatory requirements, e.g. the FCC Part 15 rule for 2.4 GHz ISM band. Coexistence of different devices deployed on an unlicensed band generally lacks centralised coordination and control and so is usually based on such technical rules and various politeness protocols.

The use of wireless telecommunications system technologies designed for operation on licensed radio spectrum, such as LTE, is becoming more and more prevalent, both in terms of increasing take-up of established uses for wireless telecommunications technologies, and also the introduction of new uses, e.g., in the developing field of machine-type communications (MTC). In order to help provide more bandwidth to support this increased use of wireless telecommunications technologies, it has recently been proposed to use unlicensed radio spectrum resources to support operations on licensed radio spectrum.

However, in contrast to licensed spectrum, unlicensed spectrum can be shared and used among different technologies, or different networks using the same technology, without any co-ordinated/centralised control, for example to provide protection against interference. As a consequence of this, the use of wireless technologies in unlicensed spectrum can be subject to unpredictable interference and has no guarantees of spectrum resources, i.e. the radio connection takes place on a best effort basis. Another aspect of using wireless technologies in unlicensed spectrum is that resources to support communications on a wireless carrier operating in the unlicensed spectrum will generally not be available on a continuous basis. Instead, is expected that wireless telecommunications networks making use of the unlicensed band will support a carrier in the unlicensed spectrum in an opportunistic manner, i.e. as and when the network is able to use the resources, for example by taking account of when relevant resources are not being used by other systems and/or by taking account of fairness/politeness protocols associated with using the unlicensed band. Consequently, communications associated with a carrier operating in the unlicensed band can be expected to be switched on and off (activated and deactivated) on a relatively frequent and unpredictable basis. That is to say, the operation of carriers in the unlicensed band can be expected to be intermittent. This means that wireless network technologies, such as LTE, which are generally designed to operate using licensed radio resources that are to a large extent continuously available, can be expected to require modified approaches to allow them to efficiently use unlicensed radio resources, and in particular to co-exist reliably and fairly with other radio access technologies that may be simultaneously operating in the unlicensed spectrum band. Even though operation on unlicensed bands gives rise to new challenges for wireless telecommunications systems, it is still desirable for the operation on the unlicensed bands to broadly followed the underlying principles of operation on licensed bands in order to help control implementation and standardisation costs, and also to facilitate coexistence of terminal devices in a wireless telecommunications system regardless of whether or not they can make use of the unlicensed band.

Therefore, deploying a mobile radio access technology system primarily designed to operate in licensed spectrum bands (i.e. having largely exclusive and continuous access to the relevant radio resources) in a manner which is suited to operation in unlicensed spectrum bands (i.e. without having exclusive and continuous access to at least some of the relevant radio resources), gives rise to new technical challenges.

SUMMARY

According to an aspect of the disclosure there is provided a method of operating a terminal device to perform measurement event evaluation for measurement reporting in respect of a downlink carrier operating in a wireless telecommunications system, the method comprising: determining that measurement event evaluation for the downlink carrier should be undertaken from a start time; obtaining measurements of a parameter associated with radio channel conditions for frequency resources used by the downlink carrier during an evaluation period beginning at the start time; establishing the extent to which the downlink carrier is being transmitted during the evaluation period; and evaluating whether to send a measurement report to network infrastructure equipment by taking account of both the measurements of the parameter during the evaluation period and the extent to which the downlink carrier is being transmitted during the evaluation period.

According to another aspect of the disclosure there is provided a terminal device configured to performing measurement event evaluation for measurement reporting in respect of a downlink carrier operating in a wireless telecommunications system, wherein the terminal device comprises a controller unit and a transceiver unit configured to operate together to: determine that measurement event evaluation for the downlink carrier should be undertaken from a start time; obtain measurements of a parameter associated with radio channel conditions for frequency resources used by the downlink carrier during an evaluation period beginning at the start time; establish the extent to which the downlink carrier is being transmitted during the evaluation period; and evaluate whether to send a measurement report to network infrastructure equipment by taking account of both the measurements of the parameter during the evaluation period and the extent to which the downlink carrier is being transmitted during the evaluation period.

According to an aspect of the disclosure there is provided circuitry for a terminal device configured to performing measurement event evaluation for measurement reporting in respect of a downlink carrier operating in a wireless telecommunications system, wherein the circuitry comprises a controller element and a transceiver element configured to operate together to: determine that measurement event evaluation for the downlink carrier should be undertaken from a start time; obtain measurements of a parameter associated with radio channel conditions for frequency resources used by the downlink carrier during an evaluation period beginning at the start time; establish the extent to which the downlink carrier is being transmitted during the evaluation period; and evaluate whether to send a measurement report to network infrastructure equipment by taking account of both the measurements of the parameter during the evaluation period and the extent to which the downlink carrier is being transmitted during the evaluation period.

Further respective aspects and features are defined by the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
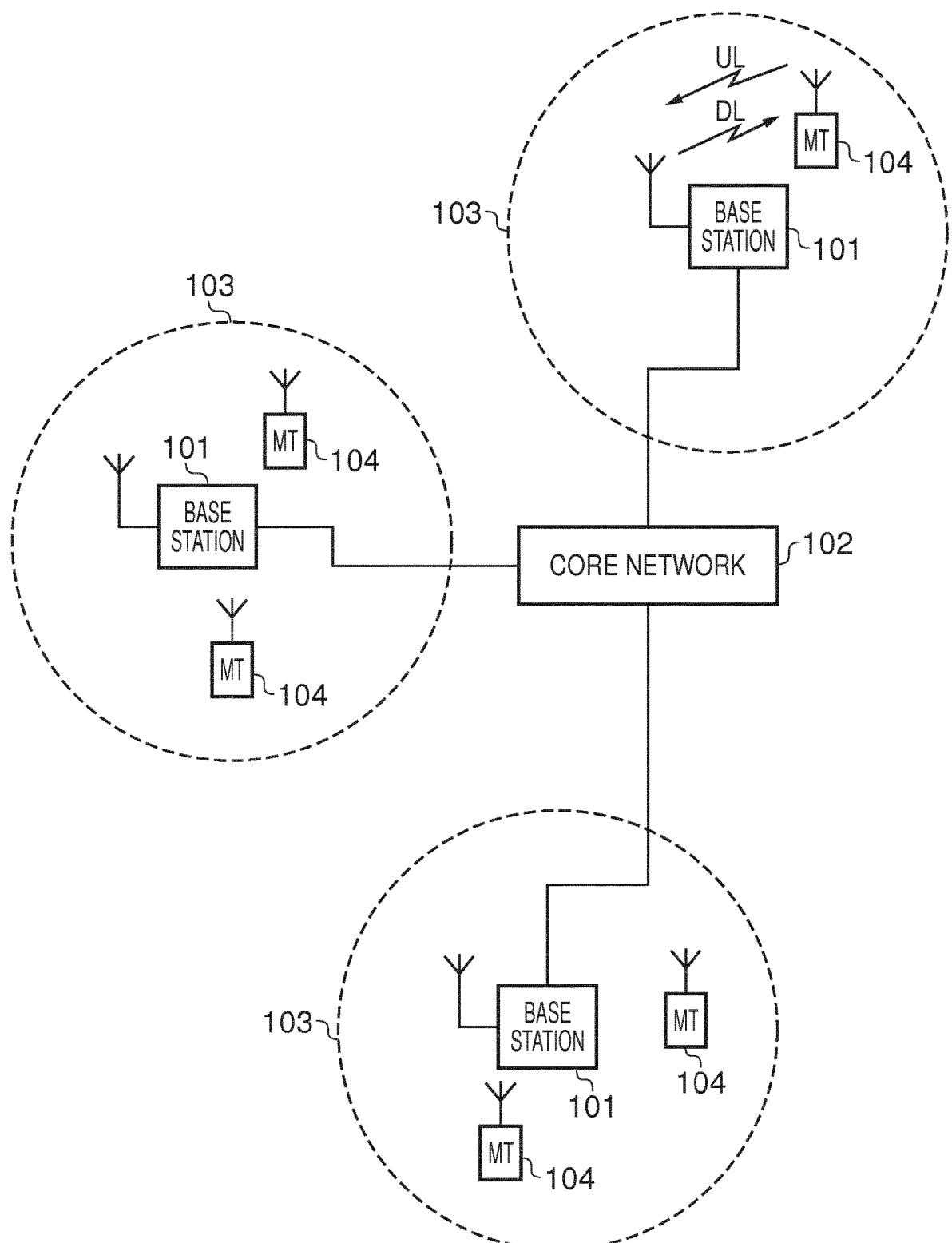
FIG. 1 provides a schematic diagram illustrating an example of a mobile telecommunication system.

FIG. 1 provides a schematic diagram illustrating some basic functionality of a mobile telecommunications network/system 100 operating in accordance with LTE principles and which may be adapted to implement embodiments of the disclosure as described further below. Various elements of FIG. 1 and their respective modes of operation are well-known and defined in the relevant standards administered by the 3GPP (RTM) body, and also described in many books on the subject, for example, Holma H. and Toskala A [1]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, communications device, and so forth. Base stations, which are an example of network infrastructure equipment, may also be referred to as transceiver stations/nodeBs/e-nodeBs, and so forth.

Figure 2:
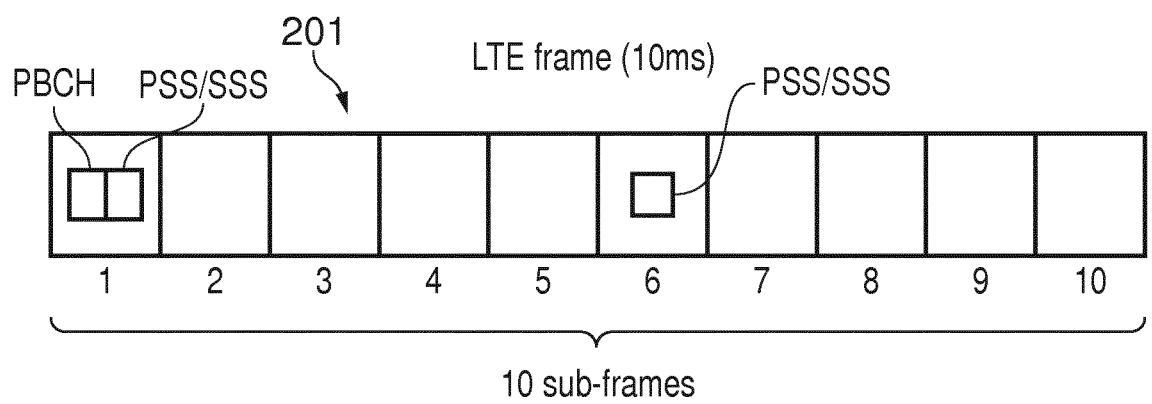
FIG. 2 provides a schematic diagram illustrating a LTE radio frame.

Mobile telecommunications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink. FIG. 2 shows a schematic diagram illustrating an OFDM based LTE downlink radio frame 201. The LTE downlink radio frame is transmitted from a LTE base station (known as an enhanced Node B) and lasts 10 ms. The downlink radio frame comprises ten subframes, each subframe lasting 1 ms. A primary synchronisation signal (PSS) and a secondary synchronisation signal (SSS) are transmitted in the first and sixth subframes of the LTE frame. A physical broadcast channel (PBCH) is transmitted in the first subframe of the LTE frame.

Figure 3:
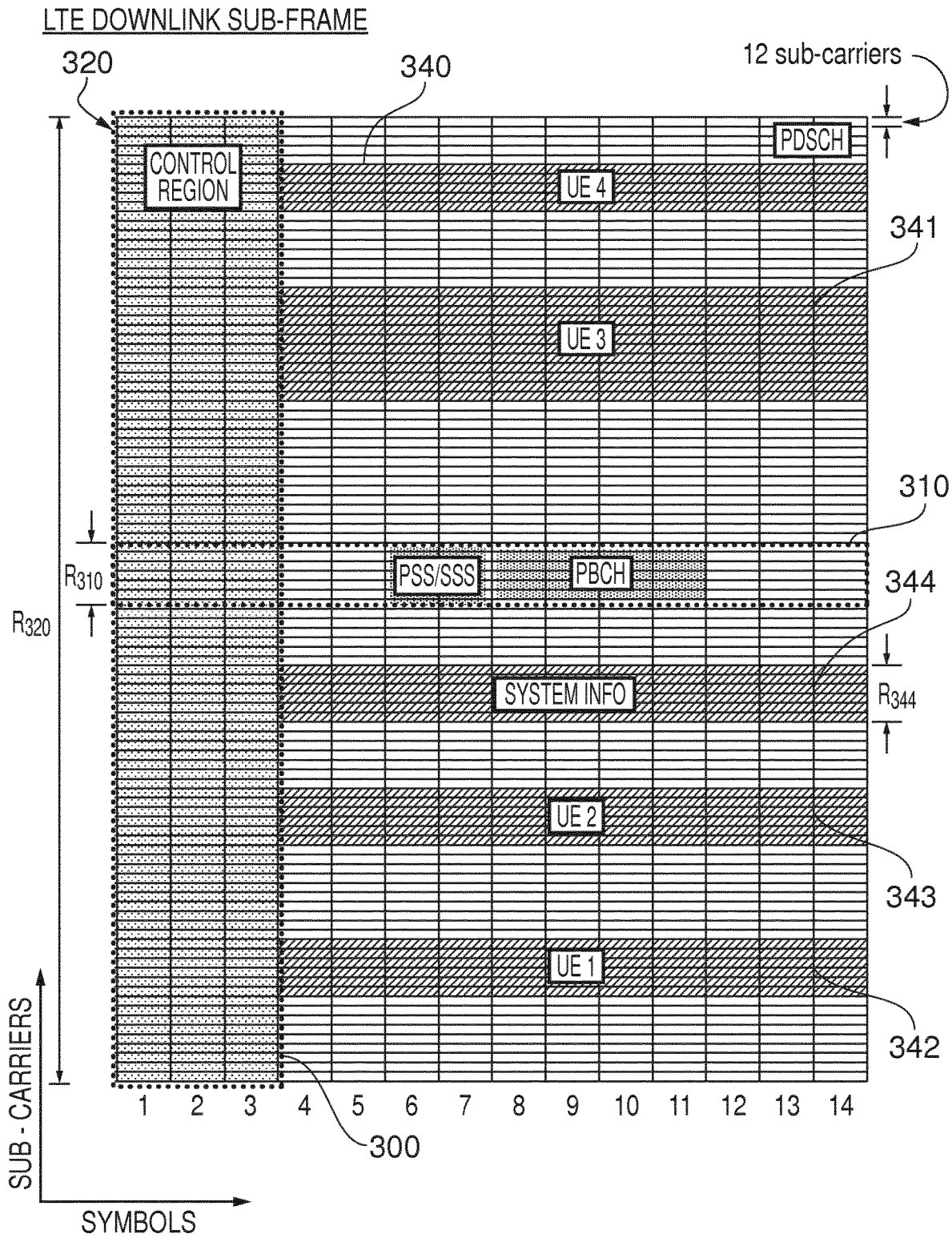
FIG. 3 provides a schematic diagram illustrating an example of a LTE downlink radio subframe.

FIG. 3 is a schematic diagram of a grid which illustrates the structure of an example conventional downlink LTE subframe. The subframe comprises a predetermined number of symbols which are transmitted over a 1 ms period. Each symbol comprises a predetermined number of orthogonal subcarriers distributed across the bandwidth of the downlink radio carrier.

The example subframe shown in FIG. 3 comprises 14 symbols and 1200 subcarriers spread across a 20 MHz bandwidth licensed for use by the operator of the network 100, and this example is the first subframe in a frame (hence it contains PBCH). The smallest allocation of physical resource for transmission in LTE is a resource block comprising twelve subcarriers transmitted over one subframe. For clarity, in FIG. 3, each individual resource element is not shown, instead each individual box in the subframe grid corresponds to twelve subcarriers transmitted on one symbol.

FIG. 3 shows in hatching resource allocations for four LTE terminals 340, 341, 342, 343. For example, the resource allocation 342 for a first LTE terminal (UE1) extends over five blocks of twelve subcarriers (i.e. 60 subcarriers), the resource allocation 343 for a second LTE terminal (UE2) extends over six blocks of twelve subcarriers (i.e. 72 subcarriers), and so on.

Control channel data can be transmitted in a control region 300 (indicated by dotted-shading in FIG. 3) of the subframe comprising the first "n" symbols of the subframe where "n" can vary between one and three symbols for channel bandwidths of 3 MHz or greater and where "n" can vary between two and four symbols for a channel bandwidth of 1.4 MHz. For the sake of providing a concrete example, the following description relates to host carriers with a channel bandwidth of 3 MHz or greater so the maximum value of "n" will be 3 (as in the example of FIG. 3). The data transmitted in the control region 300 includes data transmitted on the physical downlink control channel (PDCCH), the physical control format indicator channel (PCFICH) and the physical HARQ indicator channel (PHICH). These channels transmit physical layer control information. Control channel data can also or alternatively be transmitted in a second region of the subframe comprising a number of subcarriers for a time substantially equivalent to the duration of the subframe, or substantially equivalent to the duration of the subframe remaining after the "n" symbols. The data transmitted in this second region is transmitted on the enhanced physical downlink control channel (EPDCCH). This channel transmits physical layer control information which may be in addition to that transmitted on other physical layer control channels.

PDCCH and EPDCCH contain control data indicating which subcarriers of the subframe have been allocated to specific terminals (or all terminals or subset of terminals). This may be referred to as physical-layer control signalling/data. Thus, the PDCCH and/or EPDCCH data transmitted in the control region 300 of the subframe shown in FIG. 3 would indicate that UE1 has been allocated the block of resources identified by reference numeral 342, that UE2 has been allocated the block of resources identified by reference numeral 343, and so on.

PCFICH contains control data indicating the size of the control region (i.e. between one and three symbols for channel bandwidths of 3 MHz or greater and between two and four symbols for channel bandwidths of 1.4 MHz).

PHICH contains HARQ (Hybrid Automatic Request) data indicating whether or not previously transmitted uplink data has been successfully received by the network.

Symbols in a central band 310 of the time-frequency resource grid are used for the transmission of information including the primary synchronisation signal (PSS), the secondary synchronisation signal (SSS) and the physical broadcast channel (PBCH). This central band 310 is typically 72 subcarriers wide (corresponding to a transmission bandwidth of 1.08 MHz). The PSS and SSS are synchronisation signals that once detected allow a LTE terminal device to achieve frame synchronisation and determine the physical layer cell identity of the enhanced Node B transmitting the downlink signal. The PBCH carries information about the cell, comprising a master information block (MIB) that includes parameters that LTE terminals use to properly access the cell. Data transmitted to terminals on the physical downlink shared channel (PDSCH), which may also be referred to as a downlink data channel, can be transmitted in other resource elements of the subframe. In general PDSCH conveys a combination of user-plane data and non-physical layer control-plane data (such as Radio Resource Control (RRC) and Non Access Stratum (NAS) signalling). The user-plane data and non-physical layer control-plane data conveyed on PDSCH may be referred to as higher layer data (i.e. data associated with a layer higher than the physical layer).

FIG. 3 also shows a region of PDSCH containing system information and extending over a bandwidth of R344. A conventional LTE subframe will also include reference signals which are not shown in FIG. 3 in the interests of clarity.

The number of subcarriers in a LTE channel can vary depending on the configuration of the transmission network. Typically this variation is from 72 sub carriers contained within a 1.4 MHz channel bandwidth to 1200 subcarriers contained within a 20 MHz channel bandwidth (as schematically shown in FIG. 3). As is known in the art, data transmitted on the PDCCH, PCFICH and PHICH is typically distributed on the subcarriers across the entire bandwidth of the subframe to provide for frequency diversity.

The communications between the base stations 101 and the terminal devices 104 are conventionally made using radio resources that have been licensed for exclusive use by the operator of the network 100. These licensed radio resources will be only a portion of the overall radio spectrum. Other devices within the environment of the network 100 may be wirelessly communicating using other radio resources. For example, a different operator's network may be operating within the same geographical region using different radio resources that have been licensed for use by the different operator. Other devices may be operating using other radio resources in an unlicensed radio spectrum band, for example using Wi-Fi or Bluetooth technologies.

As noted above, it has been proposed that a wireless telecommunications network using radio resources in a licensed portion of the radio spectrum might be supported by using radio resources in an unlicensed portion of the radio spectrum (i.e. a portion of the radio spectrum over which the wireless telecommunications network does not have exclusive access, but rather which is shared by other access technologies and/or other wireless telecommunications networks). In particular, it has been proposed that carrier aggregation based techniques may be used to allow unlicensed radio resources to be used in conjunction with licensed radio resources.

In essence, carrier aggregation allows for communications between a base station and a terminal device to be made using more than one carrier. This can increase the maximum data rate that may be achieved between a base station and a terminal device as compared to when using only one carrier and can help enable more efficient and productive use of fragmented spectrum. Individual carriers that are aggregated are commonly referred to as component carriers (or sometimes simply components). In the context of LTE, carrier aggregation was introduced in Release 10 of the standard. In accordance with the current standards for carrier aggregation in an LTE-based system, up to five component carriers can be aggregated for each of downlink and uplink. The component carriers are not required to be contiguous with one another and can have a system bandwidth corresponding to any of the LTE-defined values (1.4 MHz, 3 MHz, 5 MHz, 10 MHz, 15 MHz and 20 MHz), thereby allowing a total bandwidth of up to 100 MHz. Of course it will be appreciated this is just one example of a specific carrier aggregation implementation and other implementations may allow for different numbers of component carriers and/or bandwidths.

Further information on the operation of carrier aggregation in the context of LTE-based wireless telecommunications systems can be found in the relevant standards documents, such as ETSI TS 136 211 V11.5.0 (2014-01)/3GPP TS 36.211 version 11.5.0 Release 11 [2], ETSI TS 136 212 V11.4.0 (2014-01)/3GPP TS 36.212 version 11.4.0 Release 11 [3]; ETSI TS 136 213 V11.6.0 (2014-03)/3GPP TS 36.213 version 11.6.0 Release 11 [4]; ETSI TS 136 321 V11.5.0 (2014-03)/3GPP TS 36.321 version 11.5.0 Release 11 [5]; and ETSI TS 136 331 V11.7.0 (2014-03)/3GPP TS 36.331 version 11.7.0 Release 11 [6].

In accordance with the terminology and implementation used for carrier aggregation in the context of an LTE-based system, a cell is denoted the 'primary cell', or Pcell, for a terminal device if it is the cell that is initially configured during connection setup for the terminal device. Thus the primary cell handles RRC (radio resource control) connection establishment/re-establishment for the terminal device. The primary cell is associated with a downlink component carrier and an uplink component carrier (CoC). These may sometimes be referred to herein as primary component carriers. A cell that is configured for use by the terminal device after initial connection establishment on the Pcell is termed a 'secondary cell', or Scell. Thus the secondary cells are configured after connections establishment to provide additional radio resources. The carriers associated with Scells may sometimes be referred to herein as secondary component carriers. Since in LTE up to five component carriers can be aggregated, up to four Scells (correspondingly associated with up to four secondary component carriers) can be configured for aggregation with the primary cell (associated with the primary component carrier). An Scell might not have both a downlink and uplink component carrier and the association between uplink component carriers and downlink component carriers is signalled in SIB2 on each downlink component carrier. The primary cell supports PDCCH and PDSCH on downlink and PUSCH and PUCCH on uplink whereas the secondary cell(s) support PDCCH and PDSCH on downlink and PUSCH on uplink, but not PUCCH. Measurement and mobility procedures are handled on the Pcell and the Pcell cannot be de-activated. The Scell(s) may be dynamically activated and deactivated, for example according to traffic needs, though MAC layer signalling to the terminal device. An Scells for a terminal device may also be deactivated automatically (time out) if the terminal device does not receive any transmission resource allocations on the Scell for a threshold amount of time.

Some aspects of physical layer control signalling for an LTE-based implementation of carrier aggregation based on the current standards are now described.

Each downlink component carrier has the normal LTE control channels: (E)PDCCH, PCFICH and PHICH. However, carrier aggregation introduces the possibility of so-called cross-carrier scheduling (XCS) on PDCCH. To support cross-carrier scheduling, a downlink control information (DCI) message on PDCCH includes a carrier indicator field (CIF) comprising three bits to indicate which of the component carriers the PDCCH message applies to. If there is no CIF, the PDCCH is treated as applying to the carrier on which it is received. A motivation for providing cross-carrier scheduling primarily applies for heterogeneous network (het-net) scenarios where overlaid macro- and small-cells may operate carrier aggregation in the same band. The effects of interference between the respective macro- and small-cells' PDCCH signalling can be mitigated by having the macro-cell transmit its PDCCH signalling on one component carrier at relatively high transmit power (to provide coverage across the macro-cell), while the small-cells use an alternative component carrier for their PDCCH scheduling.

The control region supporting PDCCH may differ in size (i.e. number of OFDM symbols) between component carriers, so they can carry different PCFICH values. However, the potential for interference in the control region in a het-net implementation may mean that PCFICH cannot be decoded on a particular component carrier. Therefore, current LTE standards allow for each component to carry a semi-static indication of which OFDM symbol PDSCH can be assumed to begin in each subframe. If fewer OFDM symbols are actually used for the control region, the free/spare OFDM symbol(s) may be used for PDSCH transmissions to terminal devices which are not being cross-carrier scheduled as they will decode the actual PCFICH. If more OFDM symbols actually used for the control region, there will be some degree of performance degradation for the cross-carrier scheduled terminal devices.

PHICH signalling is sent on the downlink component carrier that sent the PDCCH signalling containing the PUSCH allocation to which the PHICH signalling relates. Accordingly, one downlink component carrier may carry PHICH for more than one component carrier.

In the uplink, the basic operation of PUCCH is not altered by the introduction of carrier aggregation. However, a new PUCCH format (format 3) is introduced to support the sending of acknowledgement signalling (ACK/NACK signalling) for multiple downlink component carriers, and with some alterations to format 1b to increase the number of ACK/NACK bits it can carry.

In current LTE-based carrier aggregation scenarios, primary and secondary synchronisation signalling (PSS and SSS) are transmitted on all component carriers using the same physical-layer cell identity (PCI) and component carriers are all synchronised with one another. This can help with cell search and discovery procedures. Issues relating to security and system information (SI) are handled by the Pcell. In particular, when activating an Scell, the Pcell delivers the relevant SI for the Scell to the terminal device using dedicated RRC signalling. If the system information relating to a Scell changes, the Scell is released and re-added by Pcell RRC signalling (in one RRC message). Pcell changes, e.g. due to long-term fluctuations in channel quality across the Pcell bandwidth, are handled using a modified handover procedure. The source Pcell passes all the relevant carrier aggregation (CA) information to the target Pcell so the terminal device can begin to use all the assigned component carriers when handover is complete.

Random access procedures are primarily handled on the uplink component carrier of Pcell for a terminal device, although some aspects of contention resolution signalling may be cross-carrier scheduled to another serving cell (i.e. an Scell).

As noted above, carrier aggregation is one approach for making use of unlicensed radio spectrum resources in wireless communication networks which are primarily designed to use licensed radio spectrum. In broad summary, a carrier aggregation based approach may be used to configure and operate a first component carrier (e.g. a primary component carrier associated with a Pcell in LTE terminology) within a region of the radio spectrum that has been licensed for use by a wireless telecommunications network, and to also configure and operate one or more further component carriers (e.g. a secondary component carrier associated with an Scell in LTE terminology) in an unlicensed region of the radio spectrum. The secondary component carrier(s) operating in the unlicensed region of the radio spectrum may do so in an opportunistic manner by making use of the unlicensed radio resources when they are available. There may also be provisions made for restricting the extent to which a given operator can make use of the unlicensed radio resources, for example by defining what might be referred to as politeness protocols.

Although known carrier aggregation schemes can form a basis for using unlicensed radio spectrum resources (or other forms of shared radio resources) in conjunction with licensed radio spectrum resources, some modifications to known carrier aggregation techniques may be appropriate to help optimise performance. This is because radio interference in the unlicensed radio spectrum can be expected to be subject to a wider range of unknown and unpredictable variations in time and frequency than might be seen within a region of the radio spectrum which has been licensed for use by a particular wireless applications system. For a given wireless telecommunications system operating in accordance with a given technology, such as LTE-A, interference in the unlicensed radio spectrum may arise from other systems operating using the same technology, or from systems operating according to different technologies, such as Wi-Fi or Bluetooth.

Figure 4:
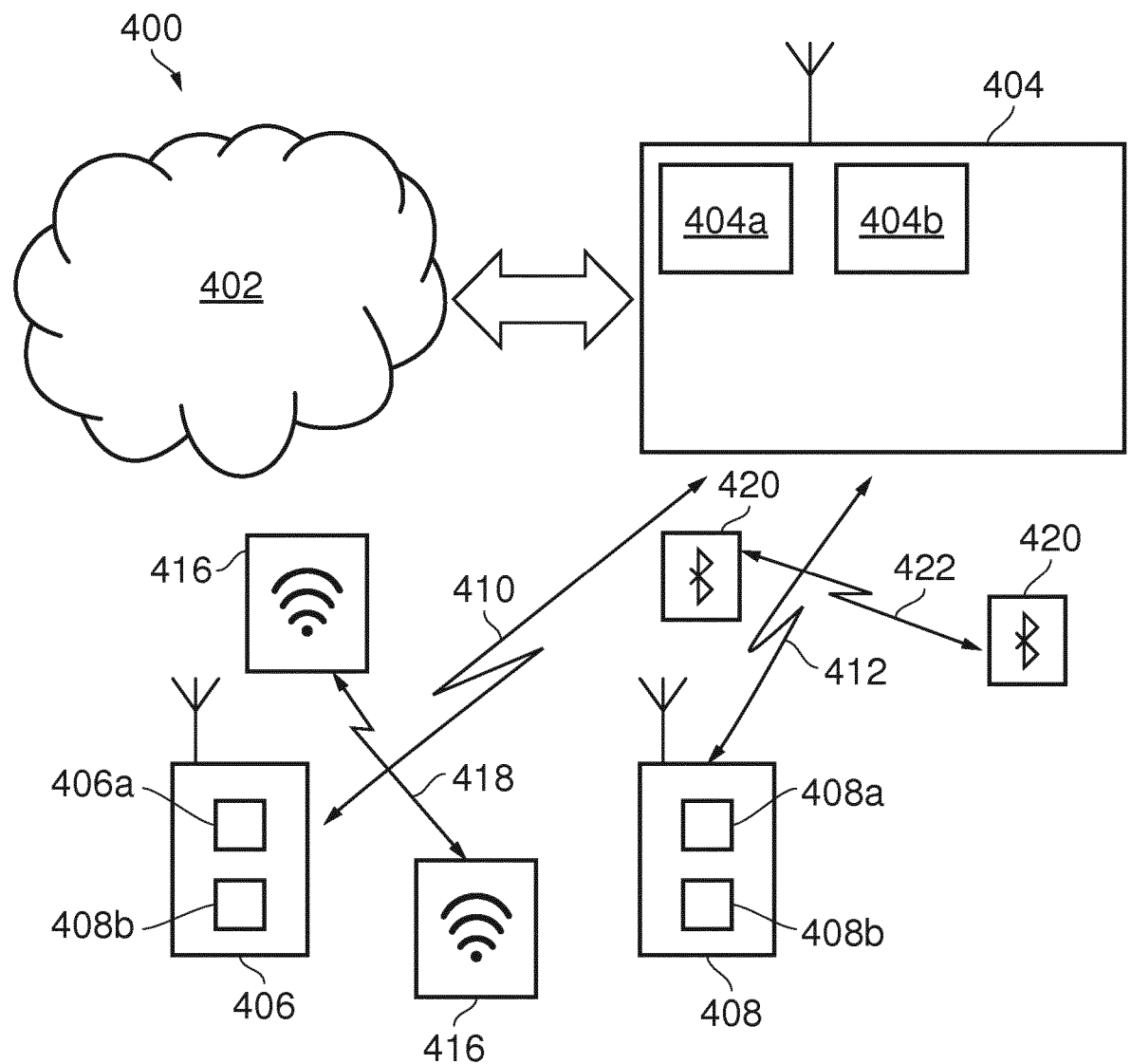
FIG. 4 schematically represents a wireless telecommunications system according to an embodiment of the disclosure.

FIG. 4 schematically shows a telecommunications system 400 according to an embodiment of the disclosure. The telecommunications system 400 in this example is based broadly on a LTE-type architecture. As such many aspects of the operation of the telecommunications system 400 are standard and well understood and not described here in detail in the interest of brevity. Operational aspects of the telecommunications system 400 which are not specifically described herein may be implemented in accordance with any known techniques, for example according to the established LTE-standards and known variations thereof.

The telecommunications system 400 comprises a core network part (evolved packet core) 402 coupled to a radio network part. The radio network part comprises a base station (evolved-nodeB) 404, a first terminal device 406 and a second terminal device 408. It will of course be appreciated that in practice the radio network part may comprise a plurality of base stations serving a larger number of terminal devices across various communication cells. However, only a single base station and two terminal devices are shown in FIG. 4 in the interests of simplicity.

Although not part of the telecommunications system 400 itself, also shown in FIG. 4 are some other devices which are operable to wirelessly communicate with one another and which are operating within the radio environment of the telecommunications system 400. In particular, there is a pair of wireless access devices 416 communicating with one another via radio link 418 operating in accordance with a Wi-Fi standard and a pair of Bluetooth devices 420 communicating with one another via radio link 422 operating in accordance with a Bluetooth standard. These other devices represent a potential source of radio interference and competition for resources for the telecommunications system 400. It will be appreciated that in practice there will typically be many more such devices operating in the radio environment of the wireless telecommunications system 400, and only two pairs of devices 416, 418 are shown in FIG. 4 for simplicity.

As with a conventional mobile radio network, the terminal devices 406, 408 are arranged to wirelessly communicate data to and from the base station (transceiver station) 404. The base station is in turn communicatively connected to a serving gateway, S-GW, (not shown) in the core network part which is arranged to perform routing and management of mobile communications services to the terminal devices in the telecommunications system 400 via the base station 404. In order to maintain mobility management and connectivity, the core network part 402 also includes a mobility management entity (not shown) which manages the enhanced packet service, EPS, connections with the terminal devices 406, 408 operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 402 to an external packet data network, for example the Internet. As noted above, the operation of the various elements of the communications system 400 shown in FIG. 4 may be broadly conventional apart from where modified to provide functionality in accordance with embodiments of the disclosure as discussed herein.

The terminal devices 406, 408 each comprise a transceiver unit 406a, 408a for transmission and reception of wireless signals and a controller unit 406b, 408b configured to control the operation of the respective devices 406, 408 in accordance with embodiments of the disclosure. The respective controller units 406b, 408b may each comprise a processor unit which is suitably configured/programmed to provide the desired functionality described herein using conventional programming/configuration techniques for equipment in wireless telecommunications systems. For each of the terminal devices 406, 408, their respective transceiver units 406*a*, 408*a* and controller units 406*b*, 408*b* are schematically shown in FIG. 4 as separate elements for ease of representation. However, it will be appreciated that for each terminal device the functionality of these units can be provided in various different ways, for example using a single suitably programmed general purpose computer, or suitably configured application-specific integrated circuit(s)/ circuitry, or using a plurality of discrete circuitry/processing elements for providing different elements of the desired functionality. It will be appreciated the terminal devices 406, 408 will in general comprise various other elements associated with their operating functionality in accordance with established wireless telecommunications techniques (e.g. a power source, possibly a user interface, and so forth).

As has become commonplace in the field of wireless telecommunications, terminal devices may support Wi-Fi and Bluetooth functionality in addition to cellular/mobile telecommunications functionality. Thus the transceiver units 406*a*, 408*a* of the respective terminal devices may comprise functional modules operable according to different wireless communications operating standards. For example, the terminal devices' transceiver units may each comprise an LTE transceiver module for supporting wireless communications in accordance with an LTE-based operating standard, a WLAN transceiver module for supporting wireless communications in accordance with a WLAN operating standard (e.g. a Wi-Fi standard), and a Bluetooth transceiver module for supporting wireless communications in accordance with a Bluetooth operating standard. The underlying functionality of the different transceiver modules may be provided in accordance with conventional techniques. For example, a terminal device may have separate hardware elements to provide the functionality of each transceiver module, or alternatively, a terminal device might comprise at least some hardware elements which are configurable to provide some or all functionality of multiple transceiver modules. Thus the transceiver units 406*a*, 408*a* of the terminal devices 406, 408 represented in FIG. 4 are assumed here to provide the functionality of an LTE transceiver module, a Wi-Fi transceiver module and a Bluetooth transceiver module in accordance with conventional wireless communications techniques.

The base station 404 comprises a transceiver unit 404*a* for transmission and reception of wireless signals and a controller unit 404*b* configured to control the base station 404. The controller unit 404*b* may comprise a processor unit which is suitably configured/programmed to provide the desired functionality described herein using conventional programming/configuration techniques for equipment in wireless telecommunications systems. The transceiver unit 404*a* and the controller unit 404*b* are schematically shown in FIG. 4 as separate elements for ease of representation. However, it will be appreciated that the functionality of these units can be provided in various different ways, for example using a single suitably programmed general purpose computer, or suitably configured application-specific integrated circuit(s)/circuitry or using a plurality of discrete circuitry/processing elements for providing different elements of the desired functionality. It will be appreciated the base station 404 will in general comprise various other elements associated with its operating functionality. For example, the base station 404 will in general comprise a scheduling entity responsible for scheduling communications. The functionality of the scheduling entity may, for example, be subsumed by the controller unit 404*b*.

Thus, the base station 404 is configured to communicate data with the first and second terminal devices 406, 408 over respective first and second radio communication links 410, 412. The wireless telecommunications system 400 supports a carrier aggregation mode of operation in which the first and second radio communication links 410, 412 each comprise a wireless access interface provided by multiple component carriers. For example, each radio communication link may comprise a primary component carrier and one or more secondary component carriers. Furthermore, the elements comprising the wireless telecommunications system 400 in accordance with this embodiment of the disclosure are assumed to support carrier aggregation in an unlicensed spectrum mode. In this unlicensed spectrum mode the base station communicates with terminal devices using a primary component carrier operating on radio resources within a first frequency band that has been licensed for use by the wireless telecommunications system and one or more secondary component carriers operating on radio resources within a second frequency band that has not been licensed for exclusive use by the wireless telecommunications system. The first frequency band may sometimes be referred to herein as a licensed frequency band and the second frequency band may sometimes be referred to herein as an unlicensed (U) frequency band. In the context of an LTE-based wireless telecommunications system, such as that represented in FIG. 4, operation in the unlicensed frequency band may be referred to as an LTE-U mode of operation. The first (licensed) frequency band may be referred to as an LTE band (or more particularly an LTE-A band) and the second (unlicensed) frequency band may be referred to as an LTE-U band. Resources on the LTE-U band may be referred to as U-resources. A terminal device able to make use of U-resources may be referred to as a U-terminal device (or U-UE). More generally, the qualifier "U" may be used herein to conveniently identify operations in respect of the unlicensed frequency band. Using unlicensed resources to support communications in a wireless telecommunications system in this way may also be referred to as licensed assisted access, LAA.

It will be appreciated that the use of carrier aggregation techniques and the use of unlicensed spectrum resources (i.e. resources that may be used by other devices without centralised coordination) in accordance with embodiments of the disclosure may be based generally around previously proposed principles for such modes of operation, for example as discussed above, but with modifications as described herein to provide additional functionality in accordance with embodiments of the present disclosure. Accordingly, aspects of the carrier aggregation and unlicensed spectrum operation which are not described in detail herein may be implemented in accordance with known techniques.

Modes of operation for the wireless telecommunications network 400 represented in FIG. 4 in accordance with certain embodiments of the disclosure will now be described. The general scenario for these embodiments is assumed to be one in which a carrier aggregation capable terminal device is operating in an LTE-A (primary) cell as normal, and is configured for measurement reporting in respect of frequency resources the base station is using for a secondary (LTE-U) carrier. The base station may thus, for example, take account of the measurement reporting when determining whether the terminal device should make use of the secondary carrier. In general, once a base station has received a measurement report from a terminal device operating in accordance with the principles described herein, the subsequent processing of the measurement report at the base station and related decision-making (i.e. with regards to whether or not the terminal device should be supported on the secondary carrier) may be made in accordance with conventional techniques. Thus, the LTE-A carrier provides a Pcell for the terminal device and LTE-U resources support an Scell that may potentially be used by the terminal device and in respect of which the terminal device is configured to provide measurement reports. It will be appreciated the LTE-A resources may also be used to provide component carriers associated with one or more further Scells(s) in accordance with conventional carrier aggregation techniques. For the examples described with reference to FIG. 4, the LTE-A transmissions in the licensed frequency band and the LTE-U transmissions in the unlicensed frequency band, and hence the corresponding Pcell and Scell(s), are both made from the same base station 404, but this need not be the case in other example embodiments. The LTE-U carrier could in general be utilised with a TDD (time division duplex) or FDD (frequency division duplex) frame structure. However, a consequence of some aspects of existing regulatory restrictions on unlicensed spectrum usage in some regions means that TDD or downlink-only FDD operation is, at least currently, a more likely deployment scenario.

Measurement reporting is a well-developed aspect of wireless telecommunications systems. For example, a terminal device operating in a cell associated with a serving base station may be configured to measure signalling characteristics of neighbouring cells and to transmit corresponding measurement reports back to its serving base station (the base station/cell to which the terminal device is currently attached). The serving base station may then use this information to determine how the terminal device can best be supported in the wireless telecommunications system. For example, if the serving base station is informed through a terminal device's measurement reports that the terminal device is in a situation in which it is seeing a relatively high signal quality/power from a neighbouring base station, the serving base station may decide to hand over the terminal device to the neighbouring base station.

It has been recognised that configuring terminal devices to provide regular measurement reports in respect of the different carriers they can detect gives rise to a corresponding increase in signalling, which can be undesirable from a system efficiency point of view. It is therefore known for terminal devices to make measurements which could form the basis for a measurement report, but to only transmit a measurement report if the measurements meet certain criteria. For example, in a scenario in which measurement reports are transmitted from a terminal device to a serving base station to help the serving base station determine whether the terminal device should be handed over to a neighbouring base station, the terminal device may be configured to only transmit a measurement report in respect of signalling received from neighbouring base stations which meet a minimum threshold, for example in terms of power or quality. That is to say, there is no need for the terminal device to provide measurement reports in respect of signalling received from neighbouring base stations which does not meet a minimum requirement.

It is known for base stations to transmit reference symbols to allow terminal devices to establish characteristics of radio channel conditions associated with transmissions from the base station. In an LTE-context, one particular characteristic that is used as a basis for measurement reporting is reference symbol received power, RSRP, although similar and corresponding characteristics are used in other wireless telecommunications systems, and more generally various different parameters relating to various different aspects of radio channel conditions may be subject to measurement reporting. For example, another parameter that may be used in the context of measurement reporting as described herein, for example in an LTE context, instead of, or in addition to RSRP, is reference signal received quality, RSRQ.

A terminal device being served on a carrier associated with a first cell may thus be configured to measure the RSRP associated with a second cell on which it is not (currently) being served, and to transmit corresponding measurement reports to network infrastructure equipment supporting communications in the first cell when the RSRP measurements for the second cell/carrier meet one or more predefined criteria. The first cell (and corresponding first carrier) may sometimes be referred to as a serving cell (serving carrier), and the second cell (and corresponding second carrier) may sometimes be referred to as a neighbouring cell (neighbouring carrier). This terminology reflects a common use of measurement reports to determine whether a terminal device should be handed over from its current cell to a neighbouring cell, for example due changing radio conditions associated with the respective cells as the terminal device moves between them. However, it will be appreciated this terminology is used herein for convenience and should not be interpreted as requiring any particular geographic relationship between the coverages associated with the different cells/carriers. In particular, in a carrier aggregation context, e.g. utilising unlicensed radio resources (i.e. LTE-U operation), it will be appreciated the geographic extent of the primary (serving) and secondary (neighbouring) cells may to some extent, and possibly completely, overlap one another.

Figure 5:
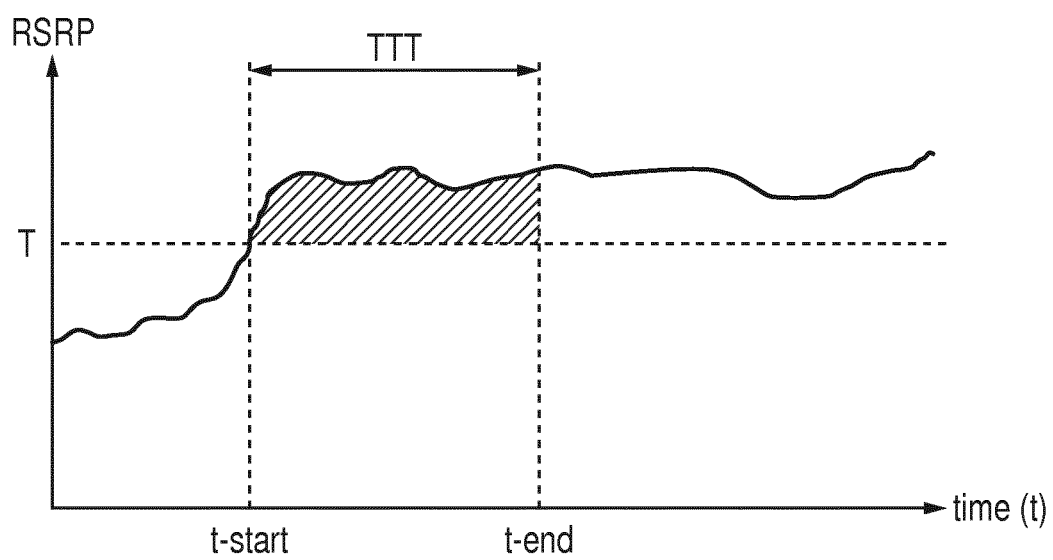
FIG. 5 schematically represents measurements made by a terminal device and some associated timings in respect of measurement reporting in a conventional LTE-based wireless telecommunications system.

FIG. 5 is a schematic diagram representing RSRP measurements made by a terminal device operating on a serving cell in respect of a downlink carrier associated with a secondary cell in support of measurement reporting in an LTE-based wireless telecommunications system and some aspects of corresponding timings for conventional LTE-type measurement reporting.

RSRP measurements are made by the terminal device as a function of time in accordance with conventional techniques. The terminal device is configured to transmit a measurement report to the base station if the RSRP measurements continuously exceed a pre-defined threshold value T for at least minimum period of time, known as a time-to-trigger, TTT. Thus, as schematically indicated in FIG. 5, the RSRP measurements are below the threshold T prior to time t-start. Accordingly, the terminal device will not be triggered to transmit a measurement report to its serving base station in respect of these measurements. However, at time t-start the terminal device identifies that the RSRP measurement has risen above the threshold T. This triggers the terminal device to begin what might be termed measurement event evaluation. Thus, the terminal device continues to monitor the RSRP measurements for a time corresponding to the pre-defined time-to-trigger, TTT, duration, which, as schematically shown in FIG. 5, expires at t-end. If the RSRP measurements exceed the pre-defined threshold from t-start to t-end, the terminal device in effect determines that the signalling received from the secondary cell is of a sufficiently high and consistent power to trigger a measurement report (a measurement event). If the RSRP throughout a given measurement event evaluation does not remain above the threshold value, the terminal device would determine from this evaluation that a measurement report should not be transmitted to the base station (i.e. a measurement event is not triggered). Basically, a measurement event is triggered and a corresponding measurement report is sent if the measurements for the hatched area schematically represented in the figure all meet the relevant criterion (i.e. RSRP exceeds T in this example).

Thus, conventional measurement reporting in wireless telecommunications systems generally relies on evaluating whether a measured parameter associated with radio channel conditions for frequency resources used by a downlink carrier, e.g. RSRP, meets a pre-defined criterion (e.g. exceed a threshold value) for the duration of an evaluation period (TTT) starting from when it is determined that measurement event evaluation should be undertaken (which might be because the measured parameter has just started to meet the relevant criterion).

Thus, to summarise one example of existing measurement reporting techniques in an LTE context, measurements (e.g. RSRP) are performed at L1 (Layer 1) by averaging all the power of resource elements containing reference symbols. Further averaging is done by taking the mean from a consecutive number of samples (e.g. a running box-car average), and these average measurements may be used for measurement event evaluation at L3 (Layer 3). When a measurement event evaluation is initiated, for example to compare measurements against a threshold, a time-to-trigger (TTT) timer is started when the measurement after Layer 3 filtering goes above the threshold. If the filtered measurements remain above the threshold for the duration of TTT, the event is deemed to be triggered and a measurement report is sent.

The inventor has recognised an issue with existing schemes for measurement event evaluation when applied to scenarios in which a cell/carrier may not be operating continuously, such as in an LTE-U context as discussed above. In particular, the inventor has recognised that in such scenarios the carrier in respect of which measurement event evaluation is being performed may not operate continuously throughout a time-to-trigger period associated with a measurement event evaluation. That is to say, once a terminal device has established that measurement event evaluation should be performed, for example because a parameter being measured exceeds a predefined threshold associated with a particular measurement event (while potentially taking account of any hysteresis that may be applied in respect of that measurement event in accordance with conventional techniques), the carrier may then be switched off/deactivated for a part of the measurement event evaluation period (i.e. TTT duration). This would cause the terminal device to fail to transmit any measurement report because the measurement event evaluation will conclude the relevant radio channel criterion/criteria were not met for a sufficient period of time. If the carrier in respect of which the measurement event evaluation is being performed is activated and deactivated on a relatively fast basis (for example on a timescale that is on the same order of, or potentially even shorter than, the measurement evaluation period TTT), the measurement event evaluation process could become significantly frustrated. For example, in an LTE context the TTT duration can be configured for each type of reporting event with a value of up to around five seconds. It may be expected that in some scenarios, such as certain LTE-U implementations, a carrier may not be able to operate continuously for this length of time. In this case, it would not be possible for a terminal device to ever determine that a measurement report should be sent in respect of a measurement event for which the TTT duration was set to a value which was longer than the maximum continuous transmission time of the carrier. One approach to overcome this might be to reduce the relevant TTT time. However, this would to some extent negate the advantages of being able to establish relatively long TTT times, for example to avoid over frequent triggering of measurement events and associated measurement reporting. This can be important in scenarios where the relevant criterion for triggering a measurement event report might frequently be satisfied only briefly. For example in the case of a relatively fast moving terminal device passing near the periphery of a relatively small cell. With this in mind, the inventor has recognised that modified measurement event evaluation procedures may provide improved performance in certain scenarios, such as in the context of a wireless telecommunications system in which a carrier is not continuously transmitted, such as might be selected for LTE-U operation.

Figure 6:
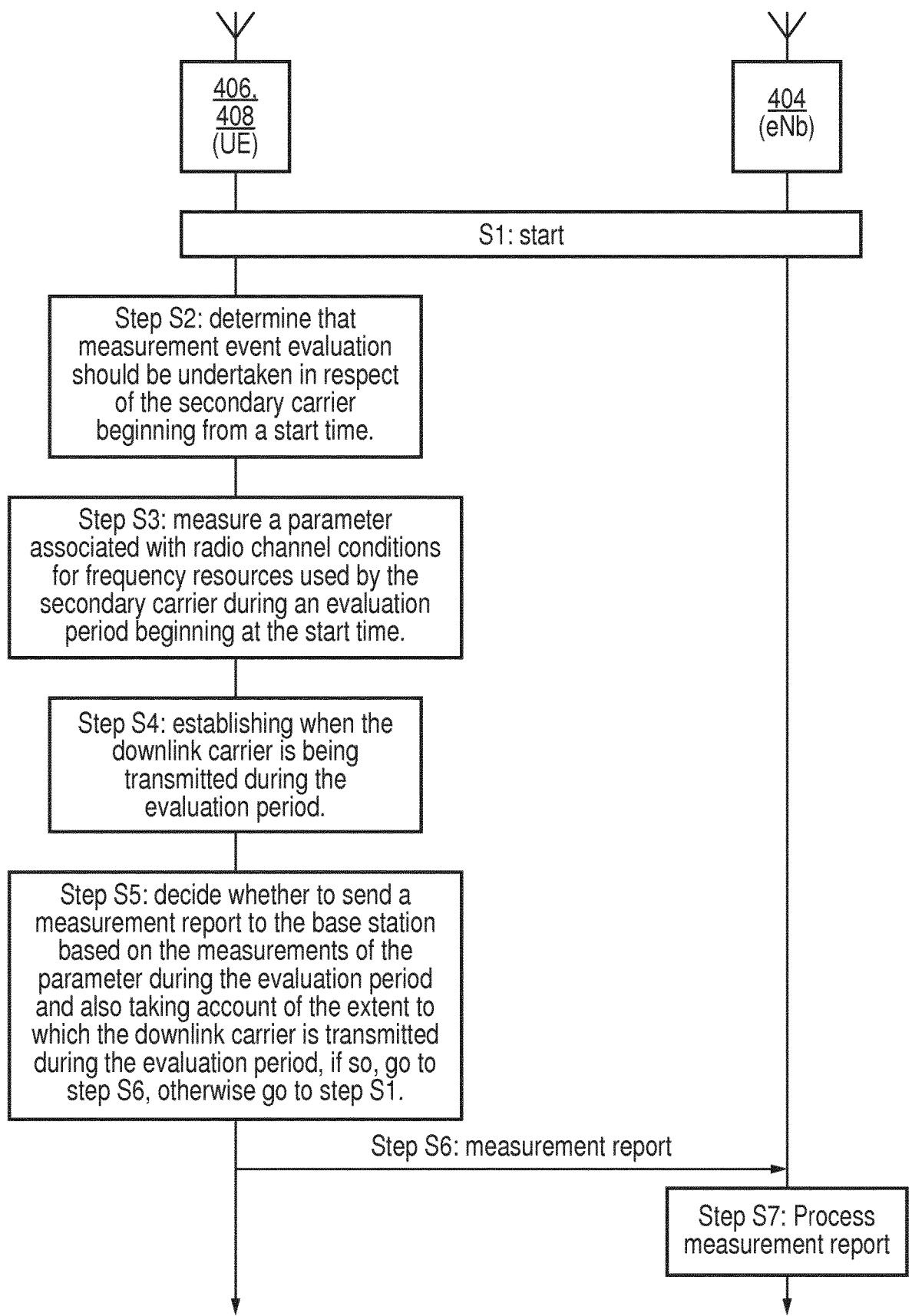
FIG. 6 is a signalling ladder diagrams representing communications between a base station and a terminal device operating in accordance with some embodiments of the disclosure.

FIG. 6 is a signalling ladder diagram schematically representing modes of operation for one of the terminal devices (UEs) 406, 408 and the base station (eNB) 404 schematically represented in FIG. 4 in accordance with certain embodiments of the present disclosure for providing a modified approach to measurement event evaluation in an LTE-U context. Thus the operation represented in FIG. 6 is within a wireless telecommunications system in which a base station 404 supports a continuously operating primary component carrier (associated with a primary cell) operating on radio resources within a first frequency band (LTE-A band) and a non-continuously operating secondary component carrier (associated with a secondary cell) operating on radio resources within a second frequency band (LTE-U band). Thus, and as discussed above, the first frequency band is taken to correspond with resources that have been licensed for dedicated use by the operator of the wireless telecommunications system 400 whereas the second frequency band is taken to correspond with resources that are shared by other wireless communication technologies, and in particular in this example by Wi-Fi. In broad summary, approaches in accordance with certain embodiments of the disclosure such as represented in FIG. 6 are based on schemes in which a terminal device determines that measurement event evaluation should be undertaken in respect of a particular downlink carrier, and in response to this obtains measurements of a relevant parameter (e.g. RSRP) during a measurement evaluation period. In addition the terminal device also establishes the extent to which the carrier is being transmitted during the evaluation period (e.g. the times when the carrier is/is not being transmitted). The terminal device then takes account of both the measurements of the parameter during the evaluation period and the extent to which the downlink carrier was being transmitted during the evaluation period when evaluating whether to send a measurement report to network infrastructure equipment (e.g. the serving base station). There are various different ways in which the terminal device can take account of the carrier on- and off-times during the evaluation period such as described further below.

The processing represented in FIG. 6 starts in step S1. It is assumed the processing starts with the base station and terminal device configured for communication on a primary carrier (Pcell) with the terminal device being configured to make channel condition measurements in respect of the secondary carrier (Scell) and to transmit measurement reports as appropriate according to the measurements. The measurement report may, for example, be used by the base station when determining whether to use the secondary carrier for communicating with the terminal device (i.e. whether to configure the terminal device for use on the secondary carrier).

In step S2 the terminal device determines that measurement event evaluation should be undertaken in respect of the secondary carrier beginning from a start time. In this example it is assumed the measurement event evaluation is in respect of measurements of reference symbol received power (RSRP) for transmissions from the base station on the secondary carrier. This aspect of the operation may be performed in accordance with conventional techniques, for example by the terminal device determining that a measurement of the RSRP has exceeded a pre-defined threshold value associated with the triggering of a measurement event evaluation.

In step S3 the terminal device measures a parameter associated with radio channel conditions associated with the secondary carrier, which, as noted above, in this example is RSRP (other indicators of radio channel conditions can be used in other implementations in accordance with the established principles of measurement event reporting in wireless telecommunications systems). The terminal device measures the RSRP throughout an evaluation period beginning from the time from which it was determined the measurement event evaluation should be undertaken in step S2. In some example implementations the evaluation period may be pre-defined and fixed (i.e. corresponding to TTT as used in a conventional LTE measurement event evaluation process), whereas in other implementations the evaluation period may be variable and depend on the extent to which they secondary carrier is being transmitted during the evaluation period. Different examples of these approaches are discussed further below. The individual measurements themselves may be obtained in accordance with conventional measurement reporting techniques in wireless telecommunications systems. For example, the measurements may comprise averages of a plurality of measurements (e.g. using layer-3 filtering such as discussed above).

In step S4 the terminal device establishes the extent to which the downlink carrier is being transmitted during the evaluation period. In particular, the terminal device establishes when the downlink carrier is being transmitted and when the downlink carrier is not being transmitted. There are various ways in which this can be done, and the specific manner is not significant to the principles underlying the present invention.

For example, in one example implementation, the wireless telecommunications system may be configured so that the secondary carrier (LTE-U carrier) is switched on and off according to a pre-defined schedule. The schedule (on/off pattern) may be predefined according to an operating standards for the wireless telecommunications system and/or may be definable in radio resource control (RRC) signalling in accordance with established techniques for communicating carrier configuration information in wireless telecommunications systems, for example using a newly defined information element in a system information block. However, a potential drawback of this approach is reduced flexibility in how a base station can rapidly adapt to changing conditions regarding the availability of the radio resources used to support the LTE-U carrier.

In another example the terminal devices may be configured to determine when during the event evaluation period the LTE-U carrier is being transmitted by tracking sudden changes in the relevant parameter (i.e. RSRP in this example). In particular, it is expected the measured values for RSRP when the carrier is being transmitted will in general be higher than when it is not transmitted. Therefore, if the terminal device identifies a sudden transition in the average level of RSRP this may be taken to be an indication there has been a change in state with regards to whether or not the carrier is being transmitted. In another example the terminal devices may also be configured to seek to decode an aspect of the signalling associated with the relevant carrier, and if the terminal device is unable to decode such signalling, it may determine the carrier is not being transmitted. In approaches such as these in which the terminal device itself seeks to determine the extent to which the carrier is being transmitted based on signalling the terminal device does or does not receive, there is potentially a risk of the terminal device noting the carrier is not being transmitted, and assuming this is part of an on-off cycle associated with non-continuous LTE-U operation, whereas in fact the carrier may have truly become undetectable for the terminal device (for example because the terminal device has moved out of the coverage area of the carrier). To avoid a situation in which the terminal device is continuously waiting for the carrier to be re-activated when in fact it is no longer available to the terminal device, a maximum off-period threshold may be defined. The terminal device may thus be configured to determine if the carrier appears to have been off (i.e. not being transmitted) for greater than the maximum off-period threshold, and if so, to conclude the carrier is no longer available to the terminal device and complete the measurement event evaluation process with a finding that no measurement report should be transmitted to the base station in respect of the carrier.

In step S5 the terminal device decides whether to send a measurement report to the base station based on measurements of the parameter (i.e. RSRP in this example) during the evaluation period while also taking account of the extent to which the downlink carrier is transmitted during the evaluation period. In some respects the manner in which account is taken of the measurements of the parameter may follow the principles underlying conventional techniques, for example requiring the power to exceed a particular threshold (potentially taking account of a degree of hysteresis) for a particular duration, However, the times from which measurement are to be used in accordance with embodiments of the disclosure are not all those from a fixed period, but are selected in a way which takes account of the extent to which the carrier is being transmitted during the evaluation period. Some different examples of how this can be done are described further below with reference to FIGS. 7 to 9.

If it is determined from the measurement event evaluation of step S5 that a measurement report should not be transmitted to the base station, the processing may return to step S1 to wait until it is determined that another measurement event evaluation should be undertaken (i.e. in another iteration through step S2). If, on the other hand, it is determined a measurement report should be undertaken, processing proceeds to step S6.

In Step S6 the terminal device transmits a measurement reports to the base station providing relevant information on the measurement event. This step may be performed in accordance with conventional measurement reporting techniques.

In Step S7 the base station processes the measurement report and may act accordingly. Again, this may be performed in accordance with conventional measurement reporting techniques. That is to say, what is significant in accordance with certain embodiments of the disclosure is the manner in which the terminal device decides whether or not to transmit a measurement report, and once this decided, the measurement report may be transmitted and handled in a conventional manner. For example, the base station may decide the terminal device should make use of the secondary carrier in respect of which the measurement report is received, and may inform/configure the terminal device accordingly. Alternatively, the base station may decide that despite the measurement report received from the terminal device indicating the terminal device could potentially be well served on the secondary carrier, the current scheduling requirements of other terminal devices operating in the wireless telecommunications system may mean the base station determines not to allocate the terminal device for communication on the secondary carrier.

As noted above, there are various different ways in which the terminal device can take account of the extent to which the carrier is being transmitted during the evaluation period. Some example approaches will be described with reference to FIGS. 7 to 9.

Figure 7:
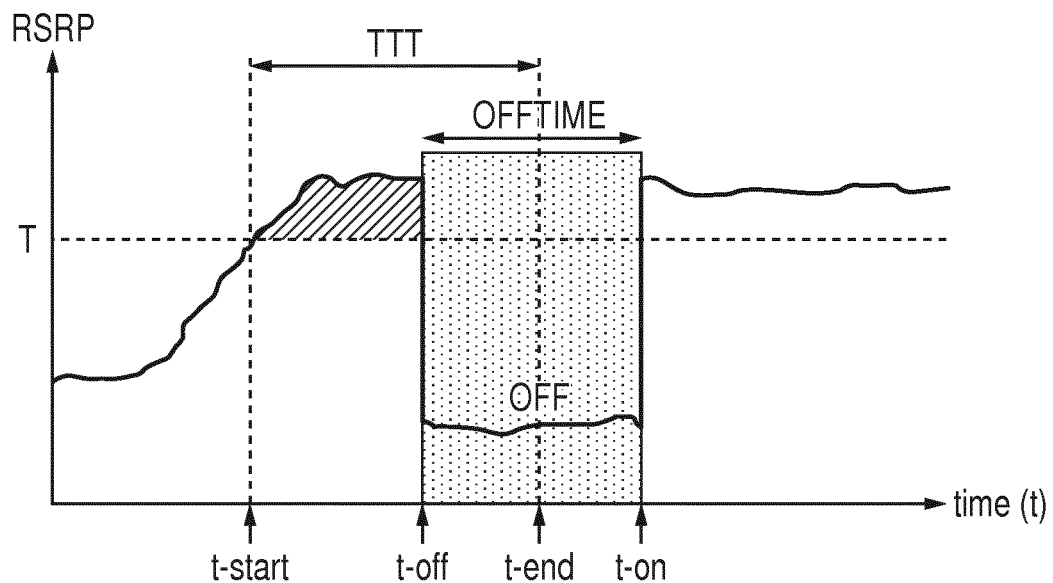
FIGS. 7 to 9 schematically represent measurements made by a terminal device and some associated timings in respect of measurement reporting in accordance various embodiments of the disclosure.

FIG. 7 is a schematic diagram representing RSRP measurements and some corresponding aspects of timings in respect of measurement event evaluation for a downlink carrier in a wireless telecommunications system in accordance with a first example approach of the processing represented in FIG. 6. Some aspects of FIG. 7 are similar to, and will be understood from, FIG. 5, but FIG. 7 additionally shows a period of time during which the carrier is not being transmitted in accordance with the principles discussed above. This period of time (which may be referred to as an off-period, as compared to when the carrier is being transmitted, which may be referred to as on-periods) is schematically represented in FIG. 7 by a shaded block marked OFF and extending from a time t-off (when the carrier goes from being transmitted to not being transmitted) to a time t-on (when the carrier goes from being not transmitted to being transmitted). The overall duration of the period during which the carrier is not being transmitted is OFFTIME (i.e. OFFTIME=t-on−t-off). As schematically shown in FIG. 7, the measured RSRP values drop significantly around the time the carrier is switched off and increase again around the time the carrier switched back on. As noted above, these sudden transitions may in some cases be used to allow the terminal device to determine when the carrier is on and when it is off (i.e. to determine the extent to which the carrier is being transmitted in step S5 of the processing represent in FIG. 6).

As schematically indicated in FIG. 7, it is assumed the RSRP measurements are below the relevant threshold T for measurement reporting in respect of RSRP prior to time t-start. However, at time t-start the terminal device identifies the RSRP measurements have risen above the threshold T. This triggers the terminal device to begin measurement event evaluation. The terminal device continues to measure the RSRP for a time corresponding to a pre-defined time-to-trigger, TTT, duration, which, as schematically shown in FIG. 7, expires at t-end. Appropriate values for the threshold T and the period TTT may be set generally in the same way as for conventional measurement report evaluation (possibly with a bias towards longer TTT values to reduce the impact of times when the carrier might not be transmitted), such as described above for FIG. 5. However, when evaluating the measurements after the evaluation period has expired (i.e. after t-end) the terminal device is configured to disregard any measurements made whilst the carrier is off. That is to say, the terminal device is configured to determine whether or not to send a measurement report based on whether the RSRP measurements exceed the pre-defined threshold from t-start to t-on (i.e. disregarding measurements in the pre-defined evaluation period TTT from t-off to t-end). In this regard, the approach of FIG. 7 they be seen as corresponding with the conventional approach using a fixed duration evaluation period, but modified to disregard measurements obtained during the evaluation period TTT when the carrier is not transmitting (so that in effect a reduced set of measurements is used for evaluation purposes as compared to the approach of FIG. 5). Basically, a measurement event is triggered and a corresponding measurement report is sent if the measurements for the hatched area schematically represented in the figure all meet the relevant criterion (i.e. RSRP exceeds T in this example). Although only one period off-period is represented in the example of FIG. 7 for simplicity, the same principles may be applied situations where the carrier is switched on and off several times during the TTT evaluation period.

Figure 8:
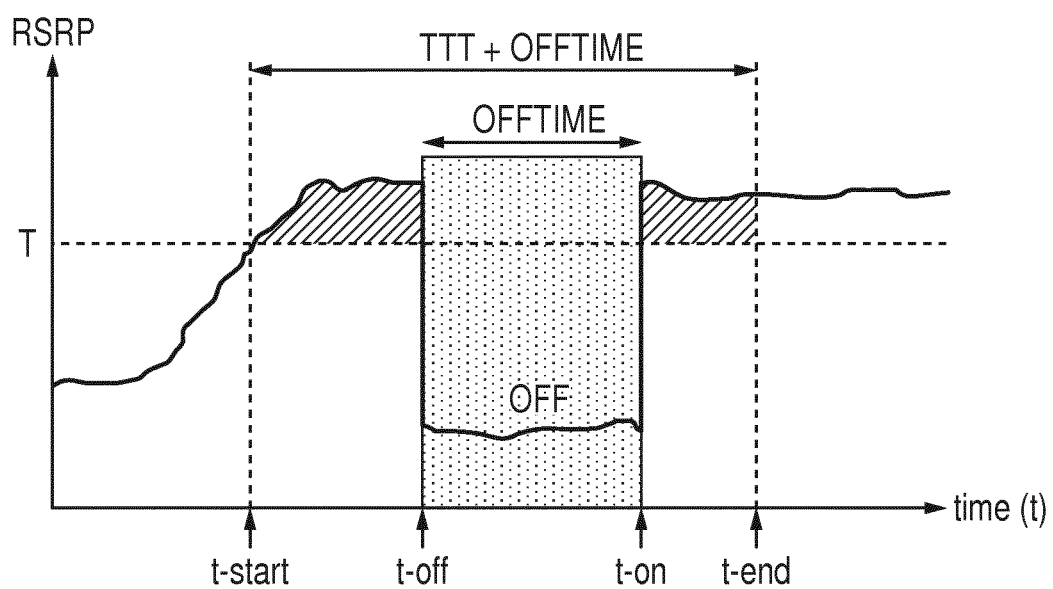

FIG. 8 is a schematic diagram representing RSRP measurements and some corresponding aspects of timings in respect of measurement event evaluation for a downlink carrier in a wireless telecommunications system in accordance with a second example approach of the processing represented in FIG. 6. Some aspects of FIG. 8 are similar to, and will be understood from, FIG. 7. However, whereas in the approach of FIG. 7 the terminal device is configured with an evaluation period that is in effect fixed at TTT, in the approach of FIG. 8, the evaluation period is in effect extended by an amount of time corresponding to the aggregated time(s) the carrier is not transmitting. Thus, whereas the evaluation period (from t-start to t-end) in the example approach of FIG. 7 is fixed at TTT, the evaluation period (from t-start to t-end) in the example approach of FIG. 8 is variable according to the duration of the off-period (i.e. the evaluation period=TTT+OFFTIME).

Thus, as schematically indicated in FIG. 8, it is assumed the RSRP measurements are below the relevant threshold T for measurement reporting in respect of RSRP prior to time t-start. However, at time t-start the terminal device identifies the RSRP measurements have risen above the threshold T. This triggers the terminal device to begin measurement event evaluation. The terminal device continues to measure the RSRP for a time corresponding to that required to accumulate an aggregation of measurements during which the carrier is being transmitted corresponding to a pre-defined time-to-trigger, TTT, duration. As schematically shown in FIG. 8, with one off-period from t-off to t-on, the evaluation period expires at t-end as a duration corresponding to TTT+OFFTIME. Appropriate values for the threshold T and the period TTT may again be set in the same way as for conventional measurement report evaluation. However, when evaluating the measurements after the evaluation period has expired (i.e. after t-end) in accordance with the approach of FIG. 8, and as with the approach of FIG. 7, the terminal device is configured to disregard any measurements made whilst the carrier is off. That is to say, the terminal device is configured to determine whether or not to send a measurement report based on whether the RSRP measurements exceed the pre-defined threshold from t-start to t-end, while in effect disregarding measurements from t-off to t-on. Basically, a measurement event is triggered and a corresponding measurement report is sent if the measurements for the hatched area schematically represented in the figure meet the relevant criterion (i.e. RSRP exceeds T in this example). In this regard, the approach of FIG. 8 may be seen as corresponding with the conventional approach based on a fixed duration evaluation period, but modified to in effect pause the TTT timer during periods when the carrier is not being transmitted, and disregarding any measurements made in this period during event evaluation. Whether or not the terminal device continues making RSRP measurements during the off-period(s) will depend on the implementation at hand. For example, if the RSRP measurements themselves are being used by the terminal device to determine when the carrier is being transmitted, it may be expected to continue making them throughout the off-period so as to be able to identify with the carrier begins being retransmitted. In other cases the terminal device may stop making RSRP measurements if it knows from another source that the carrier is off, for example to save battery power. It will be appreciated the same considerations in this regard apply for the other example approaches schematically represented in FIGS. 7 and 9.

Comparing the approaches of FIGS. 7 and 8, the approach of FIG. 7 has the advantage of the measurement event evaluation taking the same amount of time as for the conventional approach of FIG. 5. However, the approach is associated with an increased risk of triggering a measurement event report in response to only a relatively short period of time during which the relevant measurement criterion is met (because the relevant criterion need only be met for a period corresponding to TTT less any overlapping off-periods, rather than for the entire TTT duration as in the approach of FIG. 5). Conversely, the approach of FIG. 8 has the advantage of requiring the measured parameter (e.g. RSRP) to meet the relevant criterion (e.g. exceed a pre-defined threshold value) for a duration corresponding to the pre-defined TTT duration and this can help reduce the chance of a measurement report being triggered by only a relatively short period of the relevant criterion being met. However, the approach of FIG. 8 takes longer to obtain the measures needed for the measurement event evaluation because the process is in effect paused during off-periods (as noted above, the event evaluation period may be subject to a maximum threshold value, for example to account for situations in which the carrier becomes long-term unavailable, to avoid the terminal device pausing indefinitely).

Figure 9:
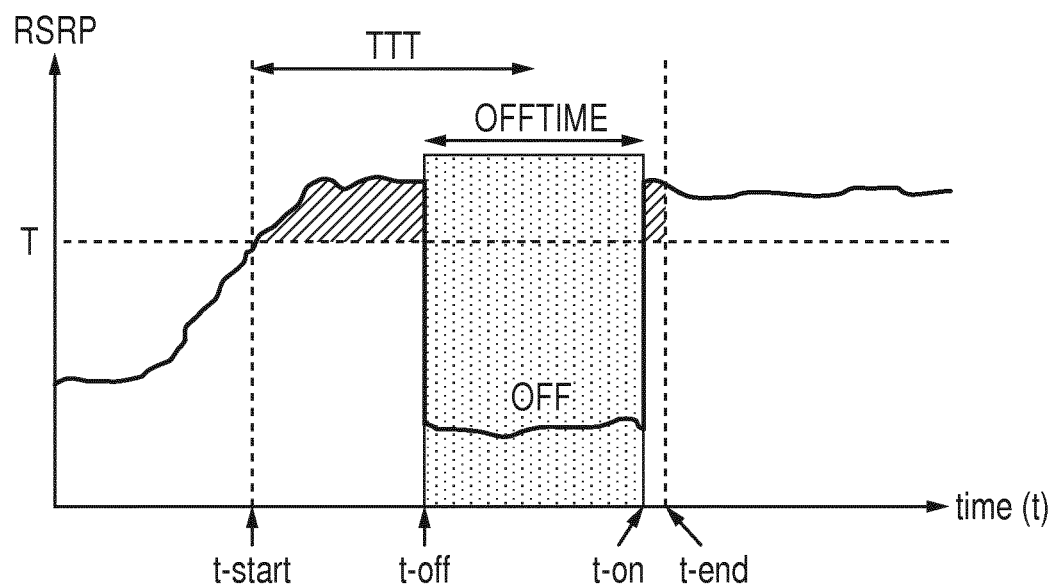

FIG. 9 is a schematic diagram representing RSRP measurements and some corresponding aspects of timings in respect of measurement event evaluation for a downlink carrier in a wireless telecommunications system in accordance with a third example approach of the processing represented in FIG. 6. Some aspects of FIG. 9 are similar to, and will be understood from, FIGS. 7 and 8. However, whereas in the approach of FIG. 7 the terminal device is configured with an evaluation period that is in effect fixed at TTT, in the approach of FIG. 9, the evaluation period is variable. Furthermore, whereas in the approach of FIG. 8 the terminal device obtains measurements for an aggregated amount of time corresponding to a fixed period during which the carrier is being transmitted (by in effect pausing the TTT timer when the carrier is not being transmitted), in the approach of FIG. 9, measurements are obtained for a variable amount of time during which the carrier is being transmitted. In essence, FIG. 9 represents an approach which balances the respective advantages and drawbacks of the approaches of FIGS. 7 and 8.

Thus, as schematically indicated in FIG. 9, it is assumed the RSRP measurements are below the relevant threshold T for measurement reporting in respect of RSRP prior to time t-start. However, at time t-start the terminal device identifies the RSRP measurements have risen above the threshold T. This triggers the terminal device to begin measurement event evaluation. The terminal device continues to measure for an evaluation period corresponding to a predefined fixed period (corresponding to TTT) plus the time taken to obtain at least one further measurement in the event the predefined fixed duration expires while the carrier is not being transmitted. Thus, referring to FIG. 9, the evaluation period runs from t-start to t-end, where t-end corresponds with t-on (or the latest t-on in the event there are multiple off-periods during TTT) plus the time taken to obtain at least one further RSRP measurement after the carrier begins transmitting again at t-on. The time to obtain this measurement will depend on the implementation hand, for example having regard to the degree of averaging (Layer-3 filtering) being applied. As with the other examples, appropriate values for the threshold T and the period TTT may again be set in the same way as for conventional measurement report evaluation. However, when evaluating the measurements after the evaluation period has expired (i.e. after t-end) in accordance with the approach of FIG. 9, and as with the approaches of FIGS. 7 and 8, the terminal device is configured to disregard any measurements made whilst the carrier is off. That is to say, the terminal device is configured to determine whether or not to send a measurement report based on whether the RSRP measurements exceed the pre-defined threshold from t-start to t-end, while in effect disregarding measurements from t-off to t-on. Basically, a measurement event is triggered and a corresponding measurement report is sent if the measurements for the hatched area schematically represented in the figure all meet the relevant criterion (i.e. RSRP exceeds T in this example). In this regard, the approach of FIG. 9 may be seen as corresponding with the conventional approach based on a fixed duration evaluation period, but modified to in effect extend the TTT timer to allow time for a further RSRP measurement if the TTT timer expires when the carrier is not being transmitted (again as noted above, the event evaluation period may be subject to a maximum threshold value, for example to account for situations in which the carrier becomes long-term unavailable, to avoid the terminal device pausing indefinitely). In the event the TTT timer does not expire during an off-period in the approach of FIG. 9, the measurement event evaluation process may cease on TTT timer expiry, and then the evaluation report may be sent based on whether the measurements made while the carrier is not being transmitted during the evaluation period meet the relevant criterion (again disregarding any measurements from when the carrier is not being transmitted).

The approach of FIG. 9 may in some respects be considered to in effect interpolate between values of the measurement of the relevant parameter from before and after an off-period (e.g. using a simple linear-interpolation between the latest measurement from before an off-period begins and the earliest measurement after a subsequent on-period begins). In this regard the interpolated values may be required to meet the relevant criterion in the same way as the measured values when determining whether to transmit a measurement report. In some implementations the measured and interpolated values from all times from T-start to T-end may all be considered (i.e. all required to meet the relevant criterion), whereas in other implementations, only the measured and interpolated values from T-start to T-start plus TTT timer might be used.

Comparing the approach of FIG. 9 with the approach of FIG. 7, the approach of FIG. 9 can help reduce the risk of a measurement report being made erroneously in response to the measured parameter meeting the relevant criterion for only a short duration before a period during which the carrier is not being transmitted. This is because the approach of FIG. 9 introduces a further check regarding whether the relevant criteria is met once the carrier restarts transmission after an off-period, and so there is a reduced chance of a sporadic brief meeting of the relevant measurement criterion before an off-period during which the TTT timer expires triggering an erroneous measurement report. Comparing the approach of FIG. 9 with the approach of FIG. 8, the approach of FIG. 9 has the advantage of being able to complete the measurement event evaluation more quickly because it need only wait to take one further measurement if the TTT timer expires during an off-period. Thus, the approach of FIG. 9 may be seen as providing a compromise between the approaches of FIGS. 7 and 8 (i.e. in being less prone to erroneous triggering than the approach of FIG. 7, while taking less time than the approach of FIG. 8).

Thus the approaches described above provide a modified approach to measurement event evaluation, for example to support mobility, which may in particular be suitable for situations in which a carrier in respect of which measurements are to be performed is not transmitted continuously. In broad summary, the approach is based on taking account of the extent to which the relevant carrier (i.e. the carrier in respect of which measurement event evaluation is being performed) is being transmitted during the measurement event evaluation period. It will, however, be appreciated that approaches for measurement event evaluation in accordance with embodiments of the present disclosure may otherwise be generally based on conventional techniques, such as discussed above with reference to FIG. 5 and discussed in various textbooks (such as Holma H. and Toskala A [1]) and defined by the relevant standards (such as ETSI TS 136 331 V11.7.0 (2014-03)/3GPP TS 36.331 version 11.7.0 Release 11 [6] for an LTE-based implementation). For example, the selection of appropriate radio characteristics to measure and appropriate threshold values to use, and where applicable the amounts of hysteresis applied, in relation to a measurement event of interest may follow established practices.

Whereas the above described approaches have mainly focused on examples in which the underlying purpose of the measurement reporting is to allow the base station to determine whether or not to use a secondary (unlicensed) downlink carrier to support a terminal device based on measurement reporting received from the terminal device in respect of the secondary downlink carrier, it will be appreciated the specific reason for the measurement reporting is not significant. For example, in another LTE-U carrier aggregation context, the terminal device may already be supported on one secondary carrier, and in this case the measurement reporting in respect of another secondary carrier may be used by the base station to determine whether to switch the terminal device to the other secondary carrier taking account of generally conventional techniques. In yet another example, in an implementation in which a terminal device may be exclusively supported on an LTE-U carrier (i.e. as opposed to aggregating an LTE-U carrier with an LTE-A carrier), the measurement reports made by the terminal device in accordance with the principles described herein may be used to determine whether to hand over the terminal device to the LTE-U carrier in respect of which the measurement reports are made. Again, the underlying principles regarding the base station decision-making process on handovers may follow conventional principles and techniques once relevant measurement reports have been received from the terminal device in accordance with the principles described herein.

It will be appreciated that while the above-described embodiments are focused on a single base station supporting both the primary component carrier the secondary component carrier, more generally these could be transmitted from separate base stations. In this regard, the network-side processing in accordance with embodiments of the present disclosure may be performed by network infrastructure equipment which comprises, for example, one base station or more than one base station, and potentially other network infrastructure equipment elements according to the operating principles of the wireless telecommunications network in which the approach is implemented.

The specific nature of the measurement event for which measurement event evaluation and subsequent decision making as regards measurement reporting is based is not significant, and the principles described herein may equally be applied in relation to different measurement events. For example, in the context of a generally LTE-based wireless telecommunications system, principles such as those described herein may be applied in respect of events such as:

Event A1—Serving cell becomes better than threshold (which may be used to stop the process of the serving cell seeking an alternative better-performing cell);

Event A2—Serving becomes worse than threshold (which may be used to start the process of the serving cell looking for an alternative better-performing cell);

Event A3—Neighbour cell becomes better than serving cell, or Event A4—Neighbour cell becomes better than threshold, or Event A5—Serving cell becomes worse than a first threshold and neighbour cell becomes better than a second threshold, or Event A6—Neighbour cell becomes offset better than secondary cell (any or all of which may be used for deciding on handovers or activation/deactivation of carriers);

Event B1—Inter RAT (radio access technology) neighbour cell becomes better than threshold, or Event B2—Serving cell becomes worse than a first threshold and inter RAT neighbour cell becomes better than a second threshold (either of which may be used for deciding on handovers between different operating technologies).

It will furthermore be appreciated the principles described above may be applied in respect of a wireless telecommunications system supporting carrier aggregation with secondary component carriers operating in a frequency band over which the wireless telecommunications system does not have exclusive control irrespective of whether or not the wireless telecommunications system requires an administrative license to operate in the secondary frequency band. That is to say, it will be appreciated the terminology "unlicensed" is used herein for convenience to refer to operation in a band over which the wireless telecommunications system does not have exclusive access. In many implementations this will correspond with a license exempt frequency band. However, in other implementations the operation may be applied in a frequency band which is not unlicensed in the strict administrative sense, but which is nonetheless available for shared/opportunistic use by devices operating according to different wireless/radio access technologies (e.g. LTE-based, Wi-Fi-based and/or Bluetooth-based technologies) and/or multiple networks operating according to the same technology (e.g. LTE-based wireless communication systems provided by different network operators). In this regard the terminology such as "unlicensed frequency band" may be considered to refer generally to a frequency band in which resources are shared by different wireless communications systems. Accordingly, while the term "unlicensed" is commonly used to refer to these types of frequency bands, in some deployment scenarios an operator of a wireless telecommunications system may nonetheless be required to hold an administrative license to operate in these frequency bands.

Thus there has been described a method of operating a terminal device to perform measurement event evaluation for measurement reporting in respect of a downlink carrier operating in a wireless telecommunications system. The method comprises determining that measurement event evaluation for the downlink carrier should be undertaken beginning at a start time. Measurements of a parameter, such as a reference signal received power, associated with radio channel conditions for frequency resources used by the downlink carrier are obtained during an evaluation period beginning at the start time. The extent to which the downlink carrier is being transmitted during the evaluation period is also established.

Whether or not to send a measurement report to network infrastructure equipment is then evaluated by taking account of both the measurements of the parameter during the evaluation period and the extent to which the downlink carrier is being transmitted during the evaluation period. A measurement report is sent by the terminal device to the network infrastructure equipment depending on the outcome of the evaluation.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of operating a terminal device to perform measurement event evaluation for measurement reporting in respect of a downlink carrier operating in a wireless telecommunications system, the method comprising: determining that measurement event evaluation for the downlink carrier should be undertaken from a start time; obtaining measurements of a parameter associated with radio channel conditions for frequency resources used by the downlink carrier during an evaluation period beginning at the start time; establishing the extent to which the downlink carrier is being transmitted during the evaluation period; and evaluating whether to send a measurement report to network infrastructure equipment by taking account of both the measurements of the parameter during the evaluation period and the extent to which the downlink carrier is being transmitted during the evaluation period.

Paragraph 2. The method of paragraph 1, wherein the evaluation period has a pre-defined fixed duration.

Paragraph 3. The method of paragraph 2, wherein evaluating whether to send a measurement report comprises determining whether measurements of the parameter when the downlink carrier is being transmitted during the evaluation period satisfy a trigger criterion irrespective of whether measurements of the parameter when the downlink carrier is not being transmitted during the evaluation period satisfy the trigger criterion.

Paragraph 4. The method of paragraph 1, wherein the evaluation period is selected so the aggregate duration for which the downlink carrier is being transmitted during the evaluation period comprises a pre-defined fixed duration.

Paragraph 5. The method of paragraph 4, wherein evaluating whether to send a measurement report comprises determining whether measurements of the parameter when the downlink carrier is being transmitted during the evaluation period satisfy a trigger criterion irrespective of whether measurements of the parameter when the downlink carrier is not being transmitted during the evaluation period satisfy the trigger criterion.

Paragraph 6. The method of paragraph 1, wherein the evaluation period is based on a pre-defined fixed duration, and wherein the evaluation period is extended beyond the pre-defined fixed duration if the pre-defined fixed duration expires at a time when the downlink carrier is not being transmitted, the evaluation period being extended in such a case until the downlink carrier starts being transmitted again to allow at least one measurement of the parameter when the downlink carrier is being transmitted again after the expiry of the pre-defined fixed duration.

Paragraph 7. The method of paragraph 6, wherein evaluating whether to send a measurement report comprises determining whether measurements of the parameter when the downlink carrier is being transmitted during the evaluation period satisfy a trigger criterion irrespective of whether measurements of the parameter when the downlink carrier is not being transmitted during the evaluation period satisfy the trigger criterion.

Paragraph 8. The method of paragraph 6 or 7, further comprising interpolating values for the measured parameter for times when the downlink carrier is not being transmitted from measurements of the parameter obtained when the downlink carrier is being transmitted, and wherein evaluating whether to send a measurement report comprises determining whether measurements of the parameter when the downlink carrier is being transmitted during the evaluation period and interpolated values before the expiry of the pre-defined fixed duration satisfy a trigger criterion.

Paragraph 9. The method of any of paragraphs 1 to 8, wherein the measurements of the parameter comprises averages of a number of observations of the parameter.

Paragraph 10. The method of any of paragraphs 1 to 9, wherein the parameter associated with radio channel conditions for frequency resources used by the downlink carrier is determined from reference signalling transmitted on the downlink carrier.

Paragraph 11. The method of paragraph 10, wherein the parameter comprises an indication of reference signal received power, RSRP and/or an indication of reference signal received quality, RSRQ.

Paragraph 12. The method of any of paragraphs 1 to 11, wherein the extent to which the downlink carrier is being transmitted during the evaluation period is established by the terminal device determining times during the evaluation period when the terminal device is unable to detect the downlink carrier.

Paragraph 13. The method of paragraph 12, further comprising the terminal device determining if it is unable to detect the downlink carrier for longer that a predefined threshold period, and if so, to stop the measurement event evaluation and determine the downlink carrier is no longer available for the terminal device.

Paragraph 14. The method of any of paragraphs 1 to 13, wherein the extent to which the downlink carrier is being transmitted during the evaluation period is established by the terminal device determining when there are changes in whether or not the downlink carrier is being transmitted by determining when a rate of change in the measurements of the parameter exceed a threshold amount.

Paragraph 15. The method of any of paragraphs 1 to 14, wherein the extent to which the downlink carrier is being transmitted during the evaluation period is established from a pre-defined schedule according to which the downlink carrier is transmitted.

Paragraph 16. The method of any of paragraphs 1 to 15, wherein establishing the extent to which the downlink carrier is being transmitted during the evaluation period comprises determining an indication of an off-period during which the downlink carrier is not being transmitted and disregarding any measurements of the parameter during the off-period when evaluating whether to send a measurement report to the network infrastructure equipment.

Paragraph 17. The method of any of paragraphs 1 to 16, wherein evaluating whether to send a measurement report to the network infrastructure equipment is based on comparing measurements of the parameter with a threshold value for times during which the downlink carrier is being transmitted during the evaluation period.

Paragraph 18. The method of any of paragraphs 1 to 17, further comprising sending a measurement report to the network infrastructure equipment if it is determined from evaluating whether to send a measurement report to the network infrastructure equipment that the terminal device should send a measurement report to the network infrastructure equipment.

Paragraph 19. The method of any of paragraphs 1 to 18, further comprising not sending a measurement report to the network infrastructure equipment if it is determined from evaluating whether to send a measurement report to the network infrastructure equipment that the terminal device should not send a measurement report to the network infrastructure equipment.

Paragraph 20. The method of any of paragraphs 1 to 19, wherein determining that measurement event evaluation for the downlink carrier should be undertaken is based on a comparison of a measurement of the parameter associated with radio channel conditions for frequency resources used by the downlink carrier with a threshold value.

Paragraph 21. The method of any of paragraphs 1 to 20, wherein the terminal device is in downlink communication with the network infrastructure equipment using a primary downlink component carrier operating on frequency resources within a first frequency band, and the downlink carrier for which measurement event evaluation is performed is a secondary component carrier using frequency resources within a second frequency band.

Paragraph 22. The method of paragraph 21, wherein the second frequency band comprises radio resources which are shared with wireless communication devices that are not part of the wireless telecommunications system.

Paragraph 23. A terminal device configured to performing measurement event evaluation for measurement reporting in respect of a downlink carrier operating in a wireless telecommunications system, wherein the terminal device comprises a controller unit and a transceiver unit configured to operate together to: determine that measurement event evaluation for the downlink carrier should be undertaken from a start time; obtain measurements of a parameter associated with radio channel conditions for frequency resources used by the downlink carrier during an evaluation period beginning at the start time; establish the extent to which the downlink carrier is being transmitted during the evaluation period; and evaluate whether to send a measurement report to network infrastructure equipment by taking account of both the measurements of the parameter during the evaluation period and the extent to which the downlink carrier is being transmitted during the evaluation period.

Paragraph 24. Circuitry for a terminal device configured to performing measurement event evaluation for measurement reporting in respect of a downlink carrier operating in a wireless telecommunications system, wherein the circuitry comprises a controller element and a transceiver element configured to operate together to: determine that measurement event evaluation for the downlink carrier should be undertaken from a start time; obtain measurements of a parameter associated with radio channel conditions for frequency resources used by the downlink carrier during an evaluation period beginning at the start time; establish the extent to which the downlink carrier is being transmitted during the evaluation period; and evaluate whether to send a measurement report to network infrastructure equipment by taking account of both the measurements of the parameter during the evaluation period and the extent to which the downlink carrier is being transmitted during the evaluation period.

REFERENCES

[1] Holma H. and Toskala A, "LTE for UMTS OFDMA and SC-FDMA based radio access", John Wiley and Sons, 2009
[2] ETSI TS 136 211 V11.5.0 (2014-01)/3GPP TS 36.211 version 11.5.0 Release 11
[3] ETSI TS 136 212 V11.4.0 (2014-01)/3GPP TS 36.212 version 11.4.0 Release 11
[4] ETSI TS 136 213 V11.6.0 (2014-03)/3GPP TS 36.213 version 11.6.0 Release 11
[5] ETSI TS 136 321 V11.5.0 (2014-03)/3GPP TS 36.321 version 11.5.0 Release 11
[6] ETSI TS 136 331 V11.7.0 (2014-03)/3GPP TS 36.331 version 11.7.0 Release 11

What is claimed is:

1. A method of operating a terminal device to perform measurement event evaluation for measurement reporting in respect of a downlink carrier operating in a wireless telecommunications system, the method comprising:
determining that measurement event evaluation for the downlink carrier should be undertaken from a start time;
obtaining measurements of a parameter associated with radio channel conditions for frequency resources used by the downlink carrier during an evaluation period beginning at the start time;
establishing an extent to which the downlink carrier is being transmitted during the evaluation period;
evaluating whether to send a measurement report to network infrastructure equipment based on the measurements of the parameter during the evaluation period, a measurement of the parameter after the downlink carrier begins transmitting again after an off-period during which the downlink carrier is not being transmitted, the extent to which the downlink carrier is being transmitted during the evaluation period, and a trigger criterion; and
sending the measurement report when the trigger criterion is met and only on condition at the trigger criterion is met, otherwise waiting for another start time and never sending the measurement report.

2. The method of claim 1, wherein the evaluation period is a pre-defined fixed duration.

3. The method of claim 2, wherein evaluating whether to send a measurement report comprises determining whether measurements of the parameter when the downlink carrier is being transmitted during the evaluation period satisfy the trigger criterion irrespective of whether measurements of the parameter when the downlink carrier is not being transmitted during the evaluation period satisfy the trigger criterion.

4. The method of claim 1, wherein the evaluation period is selected so the aggregate duration for which the downlink carrier is being transmitted during the evaluation period comprises a pre-defined fixed duration.

5. The method of claim 4, wherein evaluating whether to send a measurement report comprises determining whether measurements of the parameter when the downlink carrier is being transmitted during the evaluation period satisfy the trigger criterion irrespective of whether measurements of the parameter when the downlink carrier is not being transmitted during the evaluation period satisfy the trigger criterion.

6. The method of claim 1, wherein the evaluation period is based on a pre-defined fixed duration, and wherein the evaluation period is extended beyond the pre-defined fixed duration if the pre-defined fixed duration expires at a time when the downlink carrier is not being transmitted, the evaluation period being extended in such a case until the downlink carrier starts being transmitted again to allow at least one measurement of the parameter when the downlink carrier is being transmitted again after the expiry of the pre-defined fixed duration.

7. The method of claim 6, wherein evaluating whether to send a measurement report comprises determining whether measurements of the parameter when the downlink carrier is being transmitted during the evaluation period satisfy the trigger criterion irrespective of whether measurements of the parameter when the downlink carrier is not being transmitted during the evaluation period satisfy the trigger criterion.

8. The method of claim 6, further comprising interpolating values for the measured parameter for times when the downlink carrier is not being transmitted from measurements of the parameter obtained when the downlink carrier is being transmitted, and wherein evaluating whether to send a measurement report comprises determining whether measurements of the parameter when the downlink carrier is being transmitted during the evaluation period and interpolated values before the expiry of the pre-defined fixed duration satisfy a trigger criterion.

9. The method of claim 1, wherein the measurements of the parameter comprises averages of a number of observations of the parameter.

10. The method of claim 1, wherein the parameter associated with radio channel conditions for frequency resources used by the downlink carrier is determined from reference signalling transmitted on the downlink carrier.

11. The method of claim 10, wherein the parameter comprises an indication of reference signal received power, RSRP and/or an indication of reference signal received quality, RSRQ.

12. The method of claim 1, wherein the extent to which the downlink carrier is being transmitted during the evaluation period is established by the terminal device determining times during the evaluation period when the terminal device is unable to detect the downlink carrier.

13. The method of claim 12, further comprising the terminal device determining if it is unable to detect the downlink carrier for longer that a predefined threshold period, and if so, to stop the measurement event evaluation and determine the downlink carrier is no longer available for the terminal device.

14. The method of claim 1, wherein the extent to which the downlink carrier is being transmitted during the evaluation period is established by the terminal device determining when there are changes in whether or not the downlink carrier is being transmitted by determining when a rate of change in the measurements of the parameter exceed a threshold amount.

15. The method of claim 1, wherein the extent to which the downlink carrier is being transmitted during the evaluation period is established from a pre-defined schedule according to which the downlink carrier is transmitted.

16. The method of claim 1, wherein establishing the extent to which the downlink carrier is being transmitted during the evaluation period comprises determining an indication of an off-period during which the downlink carrier is not being transmitted and disregarding any measurements of the parameter during the off-period when evaluating whether to send a measurement report to the network infrastructure equipment.

17. The method of claim 1, wherein evaluating whether to send a measurement report to the network infrastructure equipment is based on comparing measurements of the parameter with a threshold value for times during which the downlink carrier is being transmitted during the evaluation period.

18. The method of claim 1, further comprising sending a measurement report to the network infrastructure equipment if it is determined from evaluating whether to send a measurement report to the network infrastructure equipment that the terminal device should send a measurement report to the network infrastructure equipment.

19. The method of claim 1, further comprising not sending a measurement report to the network infrastructure equipment if it is determined from evaluating whether to send a measurement report to the network infrastructure equipment that the terminal device should not send a measurement report to the network infrastructure equipment.

20. The method of claim 1, wherein determining that measurement event evaluation for the downlink carrier should be undertaken is based on a comparison of a measurement of the parameter associated with radio channel conditions for frequency resources used by the downlink carrier with a threshold value.

21. The method of claim 1, wherein the terminal device is in downlink communication with the network infrastructure equipment using a primary downlink component carrier operating on frequency resources within a first frequency band, and the downlink carrier for which measurement event evaluation is performed is a secondary component carrier using frequency resources within a second frequency hand.

22. The method of claim 21, wherein the second frequency band comprises radio resources which are shared with wireless communication devices that are not part of the wireless telecommunications system.

23. A terminal device configured to performing measurement event evaluation for measurement reporting in respect of a downlink carrier operating in a wireless telecommunications system, the terminal device comprising
   a controller and a transceiver configured to operate together to:
   determine that measurement event evaluation for the downlink carrier should be undertaken from a start time;
   obtain measurements of a parameter associated with radio channel conditions for frequency resources used by the downlink carrier during an evaluation period beginning at the start time;

establish extent to which the downlink carrier is being transmitted during the evaluation period; and evaluate whether to send a measurement report to network infrastructure equipment based on the measurements of the parameter during the evaluation period, a measurement of the parameter after the downlink carrier begins transmitting again after an off-period during which the downlink carrier is not being transmitted, and the extent to which the downlink carrier is being transmitted during the evaluation period, and a trigger criterion; and send the measurement report when the trigger criterion is met and only on condition that the trigger criterion is met, otherwise wait for another start time and never send the measurement report.

24. Circuitry for a terminal device configured to performing measurement event evaluation for measurement reporting in respect of a downlink carrier operating in a wireless telecommunications system, the circuitry comprising a controller and a transceiver configured to operate together to:

determine that measurement event evaluation for the downlink carrier should be undertaken from a start time;

obtain measurements of a parameter associated with radio channel conditions for frequency resources used by the downlink carrier during an evaluation period beginning at the start time;

establish the extent to which the downlink carrier is being transmitted during the evaluation period; and evaluate whether to send a measurement report to network infrastructure equipment based on the measurements of the parameter during the evaluation period, a measurement of the parameter after the downlink carrier begins transmitting again after an off-period during which the downlink carrier is not being transmitted, the extent to which the downlink carrier is being transmitted during the evaluation period, and a trigger criterion; and send the measurement report when the trigger criterion is met and only on condition that the trigger criterion is met, otherwise wait for another start time and never send the measurement report.

* * * * *